(12) United States Patent
Cameron

(10) Patent No.: US 9,035,584 B2
(45) Date of Patent: May 19, 2015

(54) QUADRANT CHANGE CONTROL IN BRUSHLESS DC MOTORS

(71) Applicant: The Boeing Company, Chicago, IL (US)

(72) Inventor: Douglas C. Cameron, Ladera Ranch, CA (US)

(73) Assignee: THE BOEING COMPANY, Chicago, IL (US)

( * ) Notice: Subject to any disclaimer, the term of this patent is extended or adjusted under 35 U.S.C. 154(b) by 62 days.

(21) Appl. No.: 13/933,803

(22) Filed: Jul. 2, 2013

(65) Prior Publication Data

US 2015/0008854 A1    Jan. 8, 2015

(51) Int. Cl.
*H02P 1/04* (2006.01)
*H02P 6/00* (2006.01)

(52) U.S. Cl.
CPC ...................................... *H02P 6/003* (2013.01)

(58) Field of Classification Search
CPC .................................. H02P 6/24; H02P 6/085
USPC ................. 318/400.09, 400.01, 700
See application file for complete search history.

(56) References Cited

U.S. PATENT DOCUMENTS

| | | | |
|---|---|---|---|
| 4,368,411 A | 1/1983 | Kidd | |
| 4,528,486 A | 7/1985 | Flaig et al. | |
| 7,612,520 B2 * | 11/2009 | Cyran et al. | 318/806 |
| 2005/0179463 A1 | 8/2005 | Kasuya et al. | |

FOREIGN PATENT DOCUMENTS

EP    0596472 A2    5/1994

OTHER PUBLICATIONS

Partial International Search Report, dated Oct. 9, 2014, regarding Application No. PCT/US2014/045045, 7 pages.
"Jojo, ""SCR Applications,"" Electronic Circuits and Diagram-Electronics Projects and Design. Sep. 15, 2009, 6 pages. /http://www.circuitstoday.com/scr-applications".
Cameron, Jr. et al., "Current Control in Brushless DC Motors," U.S. Appl. No. 13/303,673, filed Nov. 23, 2011, 43 pages.
Zeng et al., "Active Voltage Controller for an Electric Motor," U.S. Appl. No. 13/905,392, filed May 30, 2013, 47 pages.
International Search Report and Written Opinion, dated Jul. 22, 2014, regarding Application No. PCT/US2014/033532, 15 pages.
International Search Report and Written Opinion, dated Jan. 14, 2015, regarding Application No. PCT/US2014/045048, 20 pages.

* cited by examiner

*Primary Examiner* — David S Luo
(74) *Attorney, Agent, or Firm* — Yee & Associates, P.C.

(57) ABSTRACT

A method and apparatus for controlling a change in a quadrant of operation of a brushless direct current motor. A quadrant change in an operation of a motor is identified. In response to identifying the quadrant change, selected ones of a plurality of switches in a switch bridge are selected to be controlled to couple a direct current power source to the windings of the motor to change a direction of an actual current in the windings.

20 Claims, 13 Drawing Sheets

QUADRANT CHANGE CONTROL IN BRUSHLESS DC MOTORS

BACKGROUND INFORMATION

1. Field

The present disclosure relates generally to electric motors, such as brushless direct current (DC) motors, and to the control of such electric motors. More particularly, the present disclosure relates to controlling a brushless DC motor to change between different quadrants of operation.

2. Background

Aircraft may employ various electronic devices and systems to perform various functions on the aircraft. For example, without limitation, electric motors on an aircraft may be used to move flight control surfaces, to raise and lower landing gear, and to perform other functions on the aircraft. Power for the electric motors and other electronic systems and devices on an aircraft may be provided by an aircraft power system.

An example of a type of electric motor used on aircraft, and for many other applications, is a brushless DC electric motor. These types of motors are also known as electronically commutated motors. Brushless DC motors are powered by direct current (DC) electricity and have electronic commutators.

A brushless DC motor has permanent magnets which rotate, and a fixed armature which comprises the stator windings. An electronic controller continually switches the phase of power provided to the windings to keep the motor turning. The controller may employ a solid state circuit to provide timed power distribution to the motor windings.

Because the controller must direct the rotor rotation, the controller requires some means of determining the rotor's orientation relative to the stator windings. Some brushless DC motors use Hall effect sensors or a rotary encoder to directly measure the position of the rotor. Others measure the back electromotive force (EMF) in the undriven windings to infer the rotor position. Controllers of this latter type are often called sensorless controllers. Other sensorless controllers are capable of measuring winding saturation caused by the position of the magnets to infer the rotor position.

The controller for a brushless DC motor may provide bi-directional outputs to control the driving of DC power to the motor windings. The outputs may be controlled by a logic circuit. Simple controllers may employ comparators to determine when the output phase should be advanced. More advanced controllers may employ a microcontroller to manage acceleration, control speed, and fine tune-motor efficiency. Motor controllers of this type may be referred to as electronic speed controllers.

The controller may control the power that is provided to the windings of a DC motor by controlling the switches in a switch bridge. The switch bridge couples the DC power source to the windings of the DC motor. For example, a three-phase switch bridge may have six switches arranged to form three parallel half H-bridges for coupling the DC power source to three motor windings of a DC motor. The switches of the switch bridge may be controlled by the controller to drive a current in either direction on each of the motor windings. For example, without limitation, the switch bridge may be implemented using solid state switching devices such as metal-oxide-semiconductor field-effect transistors (MOSFETs).

Various methods may be used to control the switches in a switch bridge to modulate the current in the windings of a brushless DC motor. However, existing methods for modulating the current in the motor windings of a brushless DC motor have drawbacks. A method for controlling the current in the windings of a brushless DC motor that overcomes these drawbacks is desirable.

The rotor in a brushless DC motor may be controlled to rotate in either direction, clockwise or counter-clockwise. The current in the windings of the motor may be controlled to produce torque on the rotor in either the clockwise or counter-clockwise direction. The current in the windings may be controlled to produce torque on the rotor that is either in the same direction as the direction of rotation of the rotor, or in the opposite direction from the direction of rotation of the rotor at a particular point in time.

Operation of a brushless DC motor thus may be described with reference to four quadrants. For example, in a first quadrant of operation, the rotor may be rotating in a clockwise direction and the current in the motor windings may produce torque on the rotor in the same clockwise direction. In a second quadrant of operation, the rotor may be rotating in a counter-clockwise direction and the current in the motor windings may produce torque on the rotor in the opposite clockwise direction. In a third quadrant of operation, the rotor may be rotating in a counter-clockwise direction and the current in the motor windings may produce torque on the rotor in the same counter-clockwise direction. In the fourth quadrant of operation, the rotor may be rotating in a clockwise direction and the current in the motor windings may produce torque on the rotor in the opposite counter-clockwise direction.

It may be desirable to provide smooth and contiguous current control as a brushless DC motor is controlled to operate in all for quadrants of operation. In particular, it may be desirable to reduce or eliminate undesired currents in the motor as operation of the motor is controlled to change from one quadrant of operation to another quadrant of operation.

Accordingly, it would be desirable to have a method and apparatus that takes into account one or more of the issues discussed above as well as possibly other issues.

SUMMARY

An embodiment of the present disclosure provides an apparatus comprising a motor comprising windings and a rotor, a switch bridge, a feedback controller, a switch controller, and a quadrant change controller. The switch bridge is configured to couple a direct current power source to the windings via a plurality of switches. The feedback controller is configured to generate an output relative to a difference between a desired current in the windings indicated by a current command and an actual current in the windings identified by current feedback. The switch controller is configured to control the plurality of switches in response to the output from the feedback controller to control the actual current in the windings. The quadrant change controller is configured to identify a first quadrant change in an operation of the motor and to select first selected ones of the plurality of switches to be controlled by the switch controller to change a direction of the actual current in the windings in response to identifying the first quadrant change.

An embodiment of the present disclosure also provides a method of controlling a change in a quadrant of operation of a brushless direct current motor. A first quadrant change in an operation of a motor is identified. In response to identifying the first quadrant change, first selected ones of a plurality of switches in a switch bridge are selected to be controlled to couple a direct current power source to windings of the motor to change a direction of an actual current in the windings.

An embodiment of the present disclosure provides another method of controlling a change in a quadrant of operation of a brushless direct current motor. A quadrant change in an operation of a motor is identified. In response to identifying the quadrant change, selected ones of a plurality of switches in a switch bridge are selected to be controlled to couple a direct current power source to windings of the motor to change a direction of an actual current in the windings. Also in response to identifying the quadrant change, the selected ones of the plurality of switches are controlled to short circuit the actual current in the windings through the switch bridge.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

Figure 1:
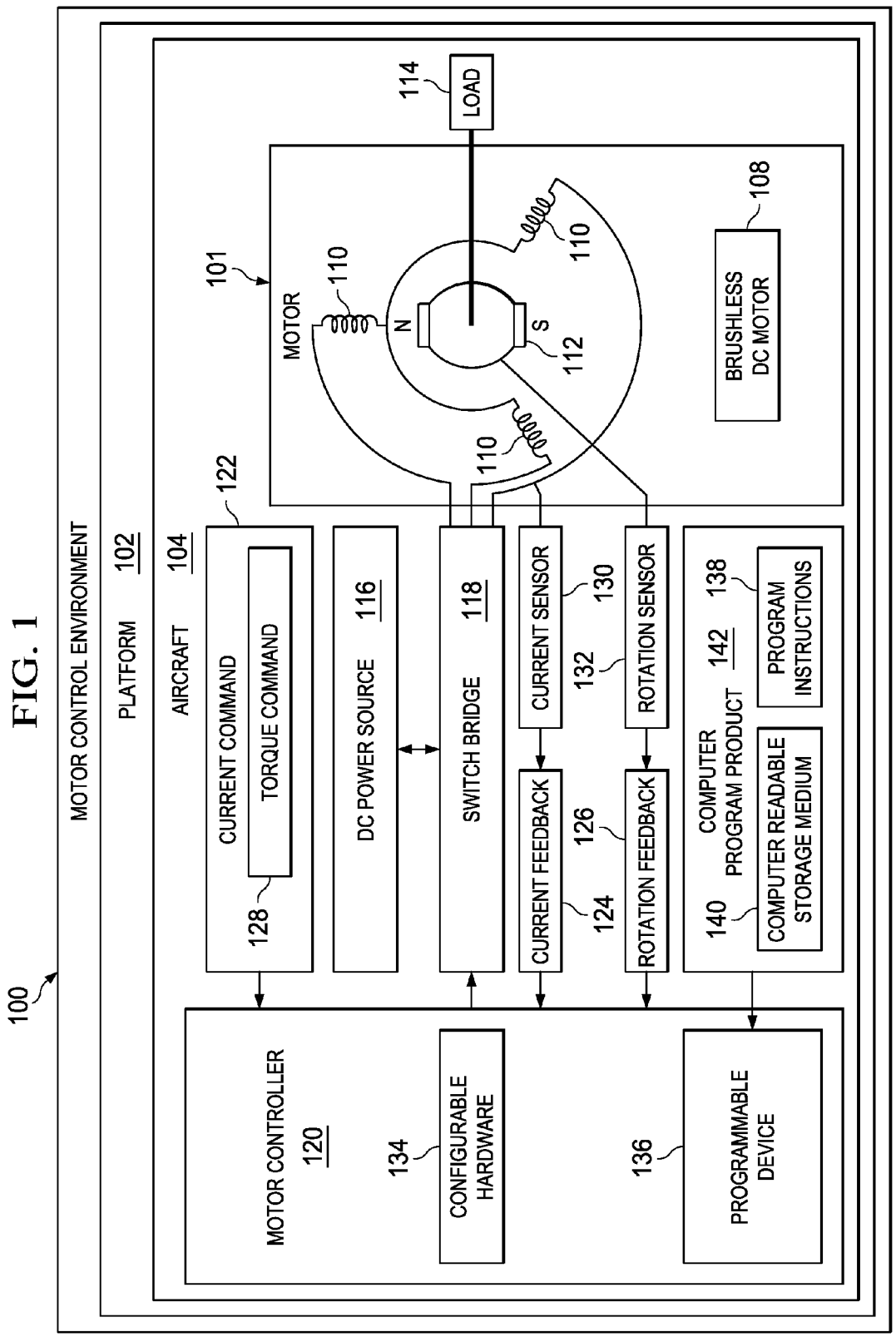
FIG. 1 is an illustration of a block diagram of a motor control environment in accordance with an illustrative embodiment.

The different illustrative embodiments recognize and take into account a number of different considerations. "A number", as used herein with reference to items, means one or more items. For example, "a number of different considerations" means one or more different considerations.

The different illustrative embodiments recognize and take into account that there are several existing methods to control current via switching modulation in motor windings. However, all of these existing methods may have drawbacks.

The different illustrative embodiments recognize and take into account that pulse width modulation (PWM) is often used to control the current in motor windings. However, motor current controlled using pulse width modulation suffers ripple currents during all operations, even quiescent operations. With pulse width modulation, a zero current command results in a ripple current. Depending upon the inductance, power supply, and duty cycle frequency, the ripple currents may become large and cause unnecessary switch heating of the switch bridge, eddy current heating of the motor, and continuously audible motor buzzing. The use of pulse width modulation methods for motor control also imposes a constraint on the minimal inductance allowable on the motor design. This restraint is in conflict with the desirability of reducing inductance to increase the high rotational rate of the rotor.

The different illustrative embodiments also recognize and take into account that other methods utilize a short-circuiting of the motor windings to eliminate ripple currents and resulting heating in the motor. However, such methods are only two quadrant controllers. Two quadrant control means that the controller can only affect a positive change in the current forcing function when the windings have a positive current. The second quadrant is affecting a negative change in the current forcing function when the windings have a negative current. Two quadrant control of motor current may cause problems when attempting to control the current in situations where the current demand is at one current level but the back electromagnetic force is causing the current to be at a higher current level in the same direction. In this example, a two quadrant controller does not provide a forcing function to drive the current in the negative direction.

The different illustrative embodiments also recognize and take into account that hysteric choppers provide another method of controlling the current in motor windings. However, these methods are highly nonlinear and can change in frequency, causing unpredictable thermal conditions.

The illustrative embodiments provide control of the current in the windings of a DC motor using impulse width modulation (IWM). The impulse width modulation of brushless DC motors is a digital algorithmic method that provides four quadrant control of current within the motor windings with a switch bridge switching configuration. During each duty cycle, closed-loop action determines the appropriate time for one switch bridge switch to be on or off in order to provide a desired positive or negative pulse of current.

In accordance with an illustrative embodiment, current is pulsed in only the desired direction for each duty cycle. The windings are then short circuited by opening or closing another switch. Therefore, only one switch is turned on and off per duty cycle. This provides a desirable switching method over conventional pulse width modulation motor control, which cycles between positive and negative current forcing functions during each duty cycle by turning on and off four switches. Impulse width modulation, in accordance with an illustrative embodiment, provides the appropriate switch selections during generative and regenerative conditions to provide precise control of current without the ripple current associated with pulse width modulation.

Turning to FIG. 1, an illustration of a block diagram of a motor control environment is depicted in accordance with an illustrative embodiment. Motor control environment 100 may be implemented for controlling motor 101 for operation on platform 102. Platform 102 may be any fixed or mobile structure on which motor 101 may be operated.

Motor control environment 100 may be configured to operate motor 101 to perform any appropriate function or combination of functions on platform 102. For example, without limitation, platform 102 may be aircraft 104 or another vehicle. Aircraft 104 may be a fixed wing, rotary wing, or lighter-than-air aircraft.

In some illustrative examples, aircraft 104 also may be manned or unmanned. For example, without limitation, aircraft 104 may be a commercial passenger aircraft, a cargo aircraft, a military aircraft, a government aircraft, a private aircraft, or any other type of aircraft configured to perform any appropriate task or mission or combination of tasks or missions. As further examples, platform 102 may be a submarine, an automobile, a satellite, or any other vehicle capable of traveling in the air, in space, on land, on the surface of water, underwater, or in any other medium or combination of media.

Motor 101 is an electric motor. Specifically, motor 101 may comprise brushless DC motor 108. For example, without limitation, motor 101 may comprise a brushless interior permanent magnet motor, a permanent-magnet synchronous motor, or any other appropriate type of brushless DC motor 108 or other appropriate electric motor.

Motor 101 comprises windings 110 and rotor 112. Windings 110 are stationary and form the motor stator. Windings 110 also may be referred to as coils. Power may be provided on windings 110 to drive rotation of rotor 112. Thus, windings 110 form the armature for motor 101.

Rotor 112 may be coupled to load 114. Load 114 may be any structure that may be moved in any manner via any appropriate direct or indirect connection to rotor 112. For example, on aircraft 104, load 114 may include actuators for flight control services, for landing gear, or for performing any other appropriate functions or combinations of functions on aircraft 104. In other applications, load 114 may be a pump, a vehicle drive train, an actuator for performing another function, or any other appropriate load or combination of loads on platform 102.

Electrical power for motor 101 may be provided by DC power source 116. DC power source 116 may comprise any appropriate source of DC power. For example, without limitation, DC power source 116 on aircraft 104 may comprise a DC bus that is provided with DC power from an AC to DC power converter. Power for the AC to DC power converter may be provided from AC power on an AC bus. AC power on the AC bus may be provided by a generator on aircraft 104. For example, without limitation, the generator may be driven by a number of engines on aircraft 104. In other applications, DC power source 116 may be another type of DC power source, such as a battery or any other appropriate source or combination of sources of DC power.

DC power source 116 is coupled to windings 110 of motor 101 via switch bridge 118. Switch bridge 118 comprises a plurality of switches that are configured to be opened and closed to connect DC power source 116 to windings 110 in a variety of configurations. The plurality of switches in switch bridge 118 may be controlled to provide the appropriate configuration of power on windings 110 to operate motor 101 in a desired manner. The number and arrangement of switches in switch bridge 118 may depend on the number of phases of windings 110 in motor 101. For example, without limitation, switch bridge 118 may be a three-phase bridge comprising three parallel half H-bridges for coupling DC power source 116 to three-phase windings in a three-phase motor.

Motor controller 120 may be configured to control the switching of switch bridge 118 to control the operation of motor 101 in a desired manner. In the present application, including in the claims, the switching of a switch bridge refers to the switching of one or more switches in a switch bridge. For example, motor controller 120 may be configured to control the switching of switch bridge 118 to provide smooth changes between quadrants of operation of motor 101 so that undesired currents in motor 101 are reduced or eliminated. For example, without limitation, motor controller 120 may employ current command 122, current feedback 124, and rotation feedback 126 to control motor 101.

Current command 122 may indicate desired current in windings 110 of motor 101. For example, without limitation, current command 122 may indicate a desired magnitude and direction of current in windings 110. The torque produced by motor 101 is a function of the current in windings 110 of motor 101. Therefore, current command 122 may be referred to as torque command 128.

Motor controller 120 may receive current command 122 to start motor 101, to stop motor 101, or to operate motor 101 or load 114 at a desired speed in a desired direction. For example, without limitation, motor controller 120 may be configured to use current command 122 to identify changes in the quadrant of operation of motor 101.

Current command 122 may be provided to motor controller 120 in any appropriate form from any appropriate source. For example, without limitation, current command 122 may be received by motor controller 120 from one or more higher level controllers for controlling motor 101 or load 114. Such a higher level controller may comprise an entirely automated controller, a human operator, or a human operator in combination with a machine controller.

Current feedback 124 may identify the current in windings 110 of motor 101. The current in windings 110 of motor 101 that is identified by current feedback 124 may be referred to as the actual current in windings 110. Preferably, current feedback 124 includes information identifying both the magnitude and direction of current in windings 110.

Current feedback 124 may be provided by any appropriate current sensor 130. Current sensor 130 may include any number of appropriate sensors that may be configured to provide the desired current feedback 124. For example, without limitation, motor controller 120 may be configured to control the switching of switch bridge 118 in an appropriate manner to cause the current in windings 110 of motor 101, as identified by current feedback 124, to match the desired current identified in current command 122.

Rotation feedback 126 may identify the rotation of rotor 112 of motor 101. Preferably, rotation feedback 126 includes information identifying both the direction and speed of rotation of rotor 112. Rotation feedback 126 may be provided by any appropriate rotation sensor 132. Rotation sensor 132 may include any number of appropriate sensors that may be configured to provide the desired rotation feedback 126. For example, without limitation, rotation feedback 126 may be used by motor controller 120 to identify changes in the quadrant of operation of motor 101 and for any other appropriate purpose for the control of motor 101.

Motor controller 120 may be implemented using hardware or hardware in combination with software. For example, motor controller 120 may be implemented using configurable hardware 134, programmable device 136, or both. Configurable hardware 134 may comprise hardware that is configurable to perform one or more functions of motor controller 120. Programmable device 136 may comprise any device that is programmable to implement one or more functions of motor controller 120. For example, without limitation, programmable device 136 may comprise a programmable microcontroller, digital signal processor, or other programmable device.

Programmable device 136 may be configured to run software or firmware in the form of program instructions 138 to implement one or more functions of motor controller 120. Program instructions 138 may be stored in any appropriate computer readable storage medium 140 for use by, or transfer to, programmable device 136. For example, without limitation, computer readable storage medium 140 may comprise a computer readable storage device or any other physical medium for storing program instructions 138. Program instructions 138 stored on computer readable storage medium 140 may comprise computer program product 142.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, motor 101 may be connected to drive more than one load. The illustrative embodiments may be used to control motors of any size for use in any application or operating environment. For example, without limitation, the illustrative embodiments may be used to control motors used on automobiles, airplanes, boats, spacecraft, and other vehicles. For example, without limitation, the illustrative embodiments may be used to control motors for pointing antennas on spacecraft, for heating ventilation and air conditioning (HVAC) systems, for boring devices for riveting on aircraft wings and fuselages, and for other applications.

Figure 2:
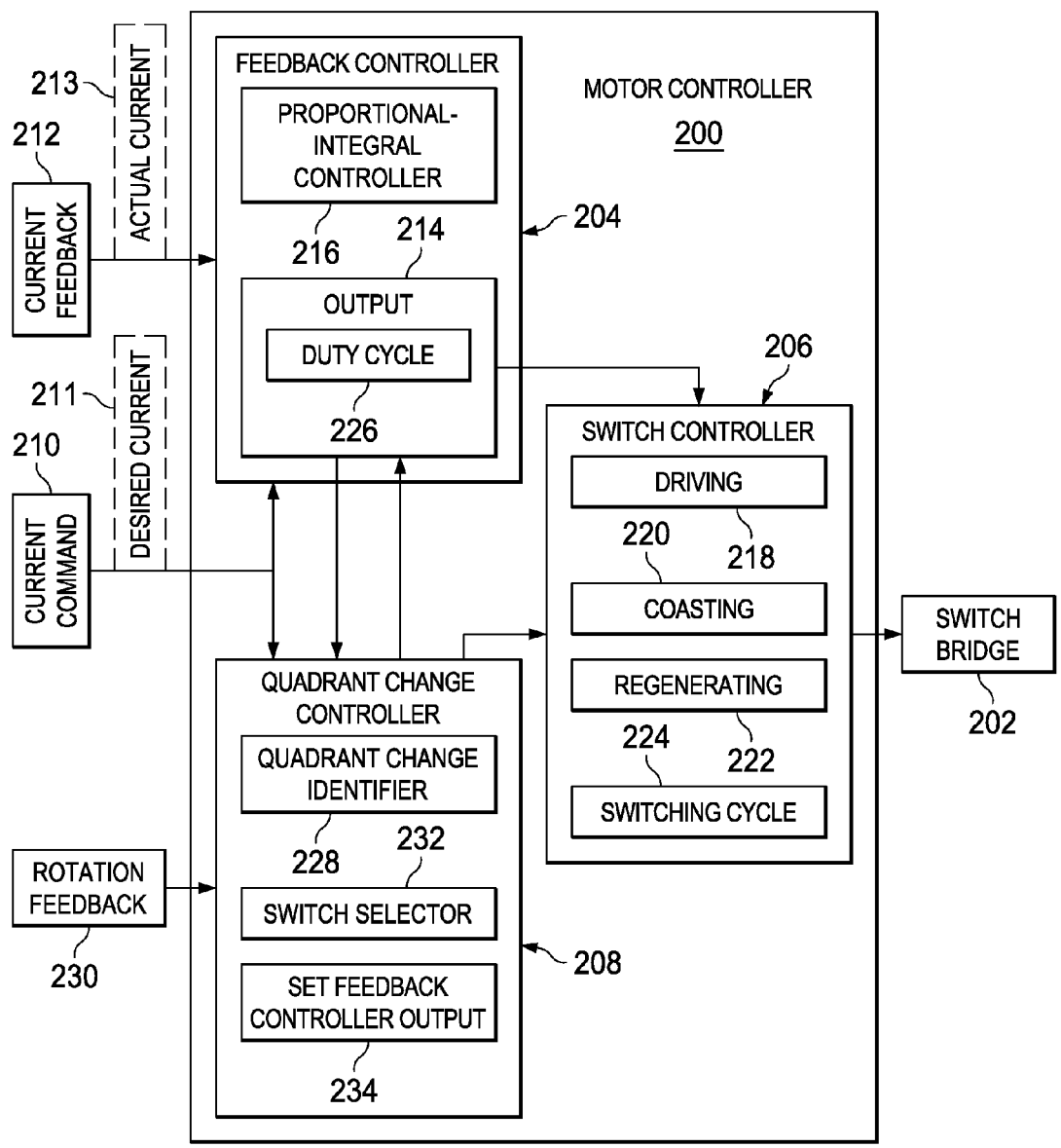
FIG. 2 is an illustration of a block diagram of a motor controller in accordance with an illustrative embodiment.

Turning to FIG. 2, an illustration of a block diagram of a motor controller is depicted in accordance with an illustrative embodiment. In this example, motor controller 200 may be an example of one implementation of motor controller 120 in FIG. 1. Motor controller 200 may be configured to control the switching of switch bridge 202 to control the operation of a brushless DC motor in a desired manner.

In this example, switch bridge 202 is an example of switch bridge 118 for motor 101 in FIG. 1. In particular, motor controller 200 may be configured to control the switching of switch bridge 202 to change the quadrant of operation of the motor in a manner that reduces or eliminates undesired currents in the motor. Motor controller 200 may comprise feedback controller 204, switch controller 206, and quadrant change controller 208.

Feedback controller 204 may be configured to receive current command 210 and current feedback 212 as input. Current command 210 may indicate desired current 211 in the windings of a motor. For example, current command 210 may indicate a desired magnitude and direction of current in the windings of a motor. Current feedback 212 may identify actual current 213 in the windings of the motor. Feedback controller 204 may be implemented in any appropriate manner to generate output 214 that is relative to the difference between desired current 211 and actual current 213. For example, without limitation, feedback controller 204 may comprise proportional-integral controller 216 or any other appropriate controller for providing output 214 relative to the difference between desired current 211 and actual current 213. Output 214 from feedback controller 204 may be provided to switch controller 206.

Switch controller 206 may be configured to generate the appropriate control signals for opening and closing the switches in switch bridge 202 in a desired manner. Any appropriate circuitry may be provided between switch controller 206 and switch bridge 202 to allow control signals generated by switch controller 206 to open and close the switches in switch bridge 202.

Switch controller 206 may be configured to open and close the switches in switch bridge 202 such that the switches in switch bridge 202 are configured for driving 218, coasting 220, or regenerating 222. When the switches in switch bridge 202 are configured for driving 218, a DC power source may be connected across the motor windings to increase the magnitude of the current in the windings. Driving 218 also may be referred to as generating current in the windings of the motor. The switches in switch bridge 202 may be configured to short-circuit the motor windings through switch bridge 202 to configure switch bridge 202 for coasting 220.

During coasting 220 the current in the motor windings may remain relatively constant. For example, during coasting 220, the current in the motor windings may decrease only due to resistance and similar losses in switch bridge 202 and the motor windings. When the switches in switch bridge 202 are configured for regenerating 222, the DC power source may be connected across the motor windings to return the energy in the motor windings to the DC power source. During regenerating 222 the magnitude of the current in the motor windings is reduced relatively quickly.

Switch controller 206 may configure switch bridge 202 for driving 218, coasting 220, or regenerating 222 based on output 214 from feedback controller 204. For example, switch controller 206 may control the switching of the switches in switch bridge 202 each switching cycle 224. The duration of switching cycle 224 may be selected in any appropriate manner. Switch controller 206 may control the switches in switch bridge 202 each switching cycle 224 to control the portion of each switching cycle 224 in which switch bridge 202 is configured for driving 218, coasting 220, or regenerating 222 based on output 214 from feedback controller 204.

For example, output 214 from feedback controller 204 may indicate that the desired current in the motor windings is greater than the present current in the motor windings. In this case, switch controller 206 may control the switches in switch bridge 202 to configure switch bridge 202 for driving 218 for at least a portion of switching cycle 224 to increase the current in the windings.

Output 214 from feedback controller 204 may comprise duty cycle 226. Duty cycle 226 may indicate the portion of each switching cycle 224 in which switch bridge 202 should be configured for driving 218, coasting 220, or regenerating 222. Switch controller 206 then may be configured to control the switches in switch bridge 202 each switching cycle 224 to implement duty cycle 226 provided as output 214 from feedback controller 204.

For example, without limitation, duty cycle 226 may be provided as a single value output 214 from feedback controller 204 that indicates both whether the desired current in the motor windings is greater than or less than the present current in the motor windings, as well as the magnitude of the difference between the desired current and the present current in the motor windings. For example, the sign of duty cycle 226 may indicate whether the desired current is greater than or less than the present current in the windings. The absolute value of duty cycle 226 may indicate the magnitude of the difference between the desired current and the present current. For example, in this case, the value for duty cycle 226 may be zero when the desired current in the motor windings matches the present current in the motor windings.

Quadrant change controller 208 may be configured to identify when a change in the quadrant of operation of a motor occurs and to control the change in operation of the motor from one quadrant of operation to another quadrant of operation in a manner that reduces undesired currents in the motor. For example, quadrant change controller 208 may include quadrant change identifier 228.

Quadrant change identifier 228 may be configured to identify a change in the quadrant of operation of the motor. For example, without limitation, quadrant change identifier 228 may identify a change in the quadrant of operation of the motor in response to both current command 210 and output 214 from feedback controller 204 indicating a desired change of direction of current in the motor windings. For example, quadrant change identifier 228 may be configured to identify a change in the quadrant of operation of the motor in response to both current command 210 indicating a change in the desired direction of current in the motor windings and output 214 from feedback controller 204 calling for switch controller 206 to configure switch bridge 202 for regenerating 222 in switching cycle 224. Quadrant change identifier 228 also may identify a change in the quadrant of operation of the motor in response to rotation feedback 230 indicating a change in the direction of rotation of the rotor.

The switches in switch bridge 202 that are controlled to configure switch bridge 202 for driving 218, coasting 220, or regenerating 222 may be different depending on the desired direction of current in the windings of the motor. In other words, the switches in switch bridge 202 that are controlled to configure switch bridge 202 for driving 218, coasting 220, or regenerating 222 may be different depending on the quadrant of operation of the motor.

Quadrant change controller 208 may include switch selector 232 for selecting the appropriate switches in switch bridge 202 that will be controlled by switch controller 206 to configure switch bridge 202 for driving 218, coasting 220, and regenerating 222 for a particular quadrant of operation of the motor. For example, without limitation, switch selector 232 may be configured to change the switches in switch bridge 202 that are controlled by switch controller 206 as appropriate in response to the identification of a change in the quadrant of operation of the motor by quadrant change identifier 228.

Quadrant change controller 208 also may be configured to set feedback controller output 234. Set feedback controller output 234 may be configured to set output 214 of feedback controller 204 in response to the identification of a change in the quadrant of operation of a motor by quadrant change identifier 228. In particular, set feedback controller output 234 may be configured to set output 214 of feedback controller 204 in response to a change in the quadrant of operation of the motor in a manner so as to reduce undesired currents in the motor at the change in the quadrant of operation of the motor.

After setting output 214 of feedback controller 204 by set feedback controller output 234 in response to a change in the quadrant of operation of the motor, feedback controller 204 then may be allowed to operate in a normal manner to regulate the current in the motor. Changes to the switching of switch bridge 202 by switch controller 206 resulting from the setting of output 214 of feedback controller 204 by set feedback controller output 234 preferably are implemented after any appropriate changes to the switches being controlled by switch controller 206 by switch selector 232.

For example, without limitation, set feedback controller output 234 may set output 214 of feedback controller 204 to call for switch controller 206 to keep the switches in switch bridge 202 open, to thereby configure switch bridge 202 for regenerating 222, for a full switching cycle 224 in response to a change in the operation of the motor from quadrant 1 to quadrant 4. As another example, set feedback controller output 234 may set output 214 of feedback controller 204 to call for switch controller 206 to configure the switches in switch bridge 202 for coasting 220 for a full switching cycle in response to a change in the quadrant of operation of the motor from quadrant 4 back to quadrant 1.

The illustration of FIG. 2 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 3:
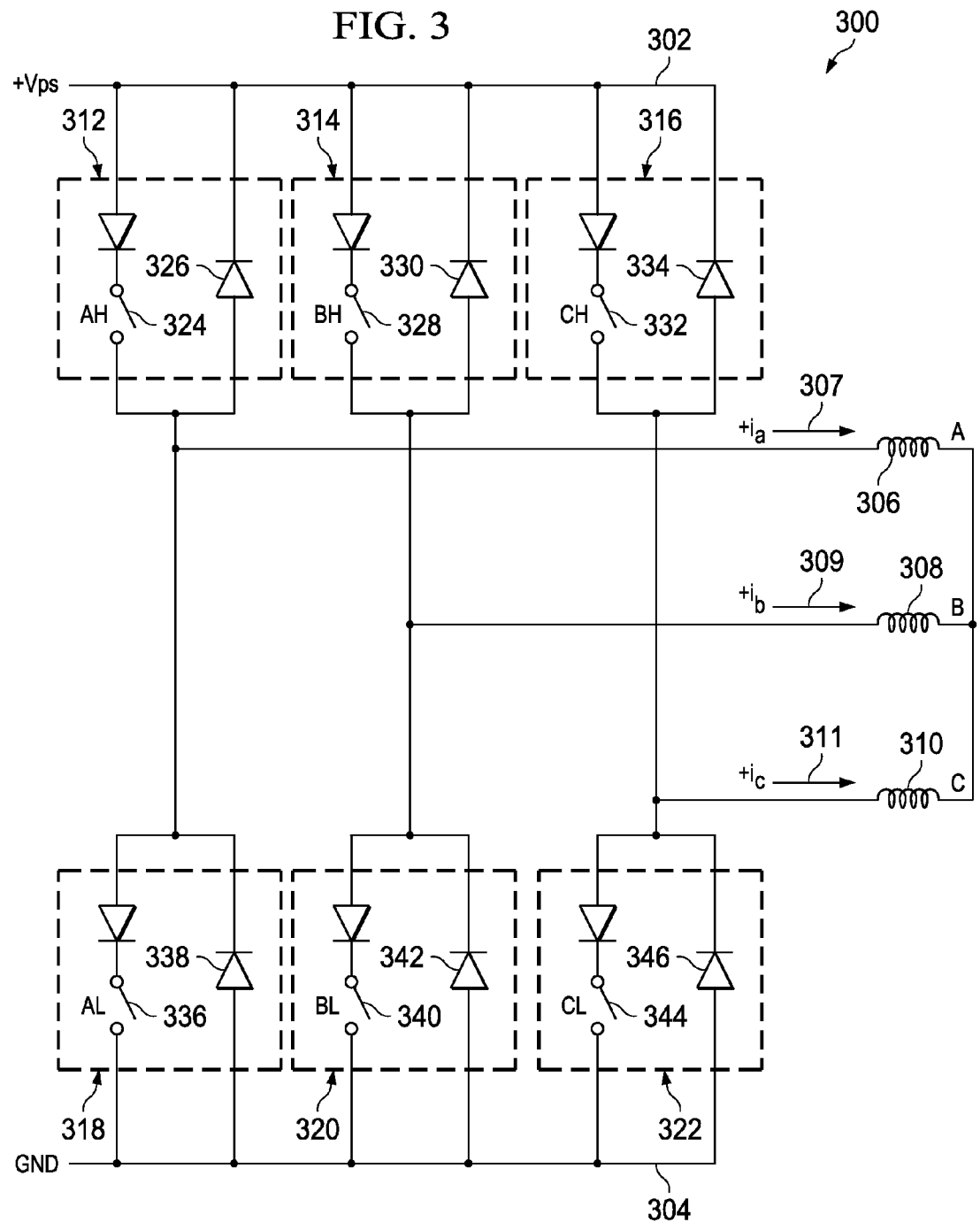
FIG. 3 is an illustration of a schematic circuit diagram of a switch bridge for controlling current in a motor in accordance with an illustrative embodiment.

Turning now to FIG. 3, an illustration of a schematic circuit diagram of a switch bridge for controlling current in a motor is depicted in accordance with an illustrative embodiment. In this example, switch bridge 300 is an example of one implementation of switch bridge 118 in FIG. 1 and switch bridge 202 in FIG. 2.

Switch bridge 300 is connected to DC power on line 302 and ground 304. Switch bridge 300 is configured to couple DC power on line 302 to windings 306, windings 308, and windings 310 of a motor.

In this example, the motor connected to switch bridge 300 is a three-phase motor comprising windings 306 for phase A, windings 308 for phase B, and windings 310 for phase C. For purposes of the present explanation, current in windings 306, windings 308, and windings 310 in the direction indicated by arrow 307, arrow 309, and arrow 311, respectively, may be referred to as positive current or current in a positive direction. Current in windings 306, windings 308, and windings 310 in the direction opposite to arrow 307, arrow 309, and arrow 311 may be referred to as negative current or current in a negative direction.

Switch bridge 300 comprises switching units 312, 314, 316, 318, 320, and 322 arranged to form three parallel half H-bridges. Switching units 312, 314, 316, 318, 320, and 322 may be implemented using solid state circuit elements. For example, without limitation, switching units 312, 314, 316, 318, 320, and 322 may be implemented using metal-oxide-semiconductor field-effect transistors (MOSFETs), insulated-gate bipolar transistors (IGBTs), or other transistors or combinations of transistors. Switching units 312, 314, 316, 318, 320, and 322 may comprise switching devices configured to conduct in a first direction when the switching devices are closed and diodes are connected in parallel with the switching devices and configured to conduct in a second direction opposite to the first direction.

Switching unit 312 is connected between line 302 and windings 306 for phase A. Switching unit 312 comprises switch AH 324 and diode 326. Switch AH 324 conducts current in the direction from line 302 to windings 306 when closed. Diode 326 is parallel with switch AH 324 and conducts current in the opposite direction of switch AH 324.

Switching unit 314 is connected between line 302 and windings 308 for phase B. Switching unit 314 comprises switch BH 328 and diode 330. Switch BH 328 conducts current in the direction from line 302 to windings 308 when closed. Diode 330 is parallel with switch BH 328 and conducts current in the opposite direction of switch BH 328.

Switching unit 316 is connected between line 302 and windings 310 for phase C. Switching unit 316 comprises switch CH 332 and diode 334. Switch CH 332 conducts current in the direction from line 302 to windings 310 when closed. Diode 334 is parallel with switch CH 332 and conducts current in the opposite direction of switch CH 332.

Switching unit 318 is connected between windings 306 for phase A and ground 304. Switching unit 318 comprises switch AL 336 and diode 338. Switch AL 336 conducts current in the direction from windings 306 to ground 304 when closed. Diode 338 is parallel with switch AL 336 and conducts current in the opposite direction of switch AL 336.

Switching unit 320 is connected between windings 308 for phase B and ground 304. Switching unit 320 comprises switch BL 340 and diode 342. Switch BL 340 conducts current in the direction from windings 308 to ground 304 when closed. Diode 342 is parallel with switch BL 340 and conducts current in the opposite direction of switch BL 340.

Switching unit 322 is connected between windings 310 for phase C and ground 304. Switching unit 322 comprises switch CL 344 and diode 346. Switch CL 344 conducts current in the direction from windings 310 to ground 304 when closed. Diode 346 is parallel with switch CL 344 and conducts current in the opposite direction of switch CL 344.

In accordance with an illustrative embodiment, the switches in switch bridge 300 may be controlled using impulse width modulation to control the current in windings 306, windings 308, and windings 310. For an existing current in either a positive or negative direction in one of windings 306, windings 308, or windings 310, switch bridge 300 may be configured for driving the existing current from the DC power on line 302, for coasting the existing current in switch bridge 300, or for regenerating the existing current back to line 302. Switch bridge 300 also may be controlled to reverse the current in windings 306, windings 308, and windings 310 to change the quadrant of operation of the motor.

Switch bridge 300 is an example of a generic switch bridge structure that is presented to more clearly describe the operation of various illustrative embodiments. The illustration of FIG. 3 is not meant to imply physical or architectural limitations to the manner in which a switch bridge in accordance with different illustrative embodiments may be implemented. A switch bridge, in accordance with different illustrative embodiments, may be implemented with combinations of parts that are different from those illustrated for example in FIG. 3.

For example, for a switch bridge implemented using IGBTs, the diodes in the switching units of the switch bridge may need to be provided as separate devices, because IGBTs do not have body diodes. For a switch bridge implemented using MOSFETs, the internal body diodes of the MOSFETs may be used. With MOSFETs used for switches, separate freewheeling diodes are not necessary. Separate diodes in series with the MOSFET switches also are not necessary, but may be used in some applications.

Turning to FIGS. 4-7, various configurations of switch bridge 300 in FIG. 3 for driving, coasting, and regenerating the current in the windings of a motor are depicted in accordance with an illustrative embodiment. The example configurations in FIGS. 4-7 are for driving, coasting, and regenerating the current in one set of windings of a motor operating in a first quadrant of operation. Switching configurations of a switch bridge for driving, coasting, and regenerating the current in other windings of the motor and for other quadrants of operation will be known to those skilled in the art based on the detailed description and examples of illustrative embodiments as presented herein.

Figure 4:
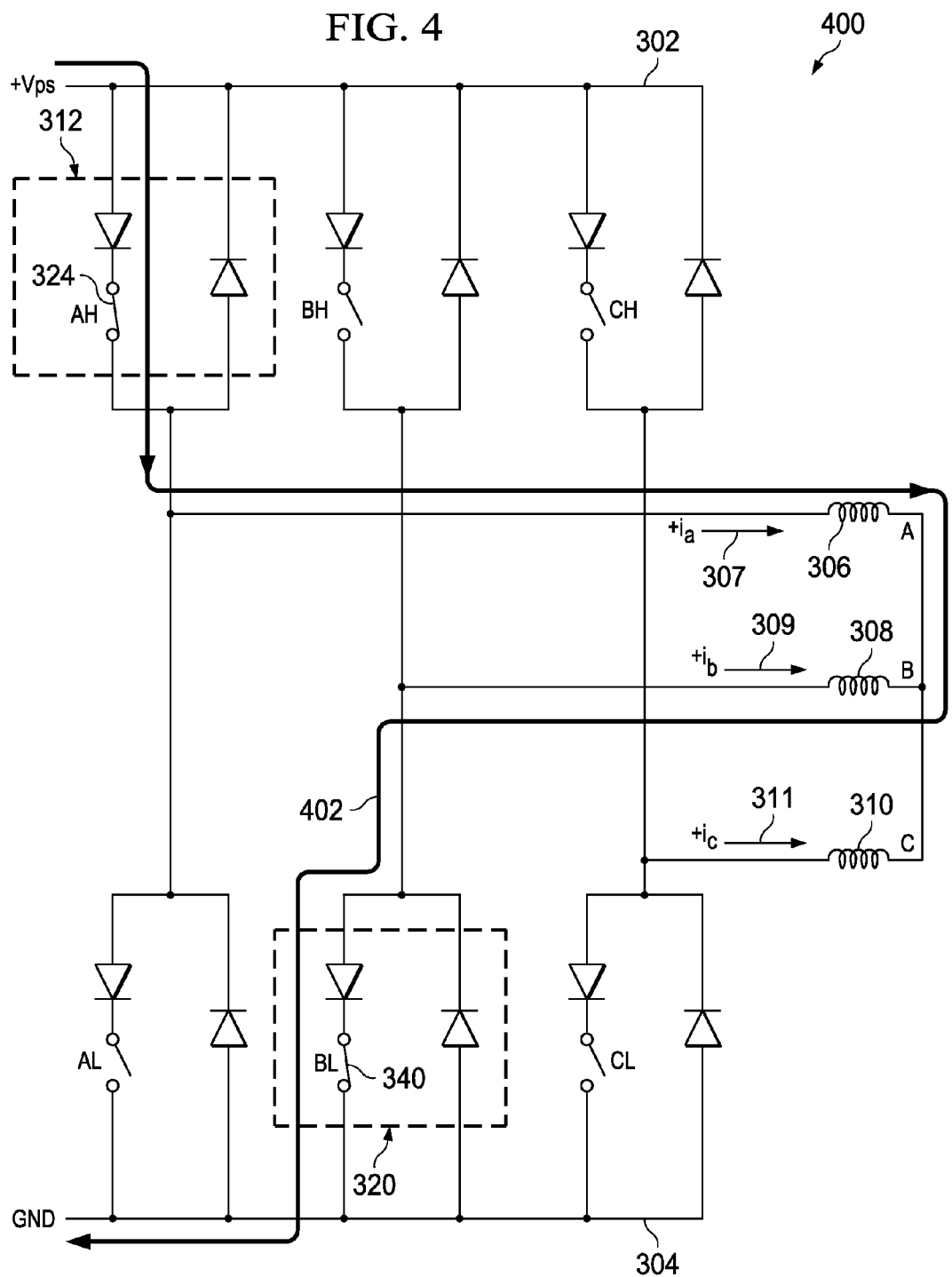
FIG. 4 is an illustration of a schematic circuit diagram of a switch bridge for controlling current in a motor in a driving configuration in accordance with an illustrative embodiment.

Turning to FIG. 4, an illustration of a schematic circuit diagram of a switch bridge for controlling current in a motor in a driving configuration is depicted in accordance with an illustrative embodiment. In this example, switch bridge 400 is an example configuration of switch bridge 300 in FIG. 3.

In this example, the driving configuration for switch bridge 400 comprises closing switch AH 324 and switch BL 340. Closing switches AH 324 and BL 340 results in current 402 running from line 302 through closed switch AH 324, in the positive direction of arrow 307 through windings 306 for phase A, and through closed switch BL 340 to ground 304. Assuming an existing positive current in windings 306 in the direction of arrow 307, current 402 will drive the existing current in windings 306, thereby increasing the current in windings 306. For example, without limitation, the driving configuration for switch bridge 400 may be used in response to an indication from a motor controller that the current in the positive direction of arrow 307 in windings 306 should be increased.

Figure 5:
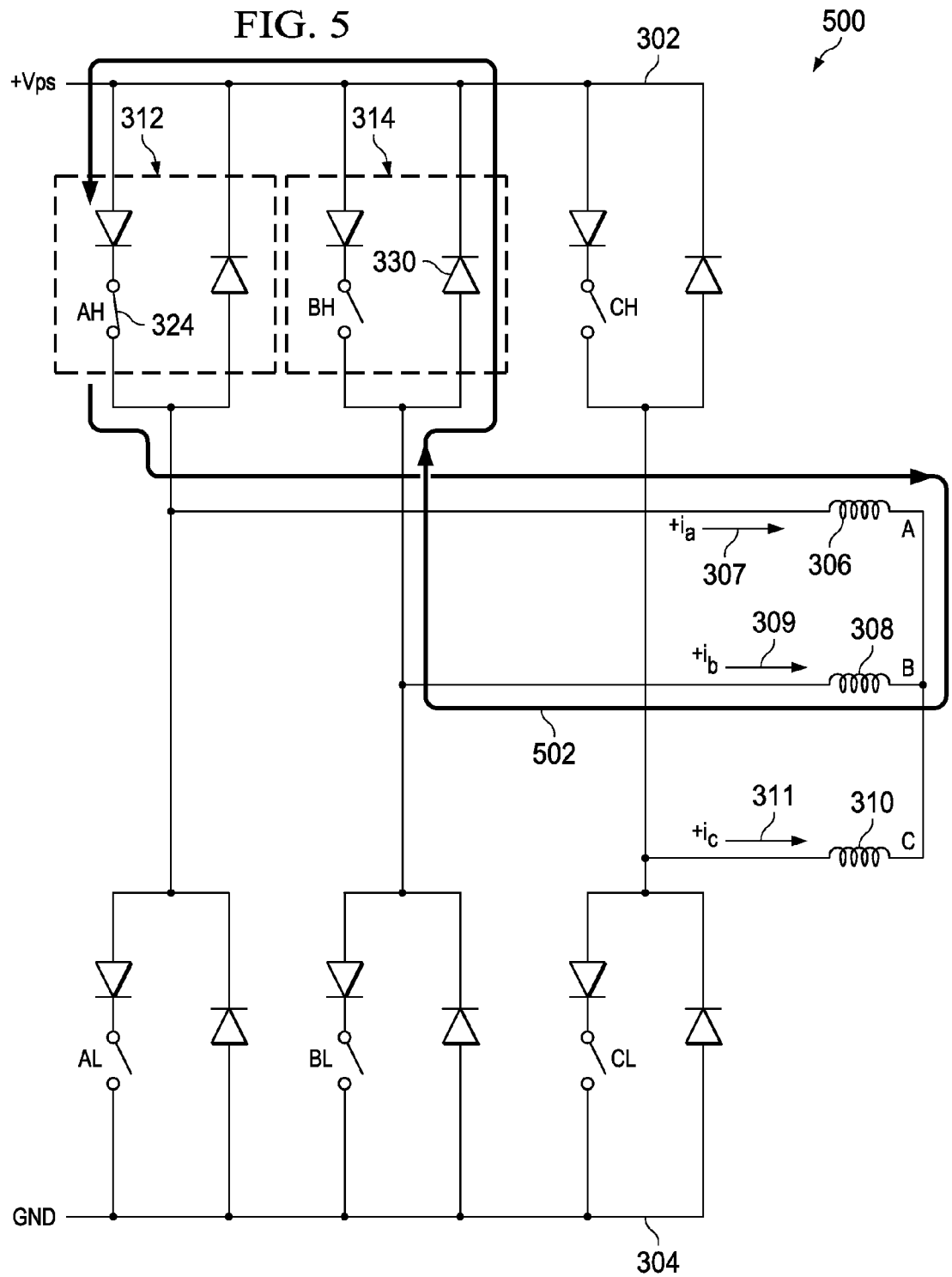
FIG. 5 is an illustration of a schematic circuit diagram of a switch bridge for controlling current in a motor in a first coasting configuration in accordance with an illustrative embodiment.

Turning now to FIG. 5, an illustration of a schematic circuit diagram of a switch bridge for controlling current in a motor in a first coasting configuration is depicted in accordance with an illustrative embodiment. In this example, switch bridge 500 is another example configuration of switch bridge 300 in FIG. 3.

In this example, switch AH 324 is closed to provide the coasting configuration for switch bridge 500. Assuming an existing positive current in windings 306 in the direction of arrow 307, closing switch AH 324 creates a short circuit through switch bridge 500 for the existing current in windings 306. The resulting current 502 in switch bridge 500 runs from windings 306 through diode 330 in switching unit 314, through closed switch AH 324, and back to windings 306 in the positive direction of arrow 307. The existing current in windings 306 may remain relatively constant with switch bridge 500 in coasting configuration.

With switch bridge 500 in coasting configuration the existing current in windings 306 may decrease by a relatively small amount due to resistance and similar losses in switch bridge 500 and windings 306 windings and 308. For example, without limitation, the coasting configuration for switch bridge 500 may be used in response to an indication from a motor controller that the current in the positive direction of arrow 307 in windings 306 should be maintained at the present level.

Figure 6:
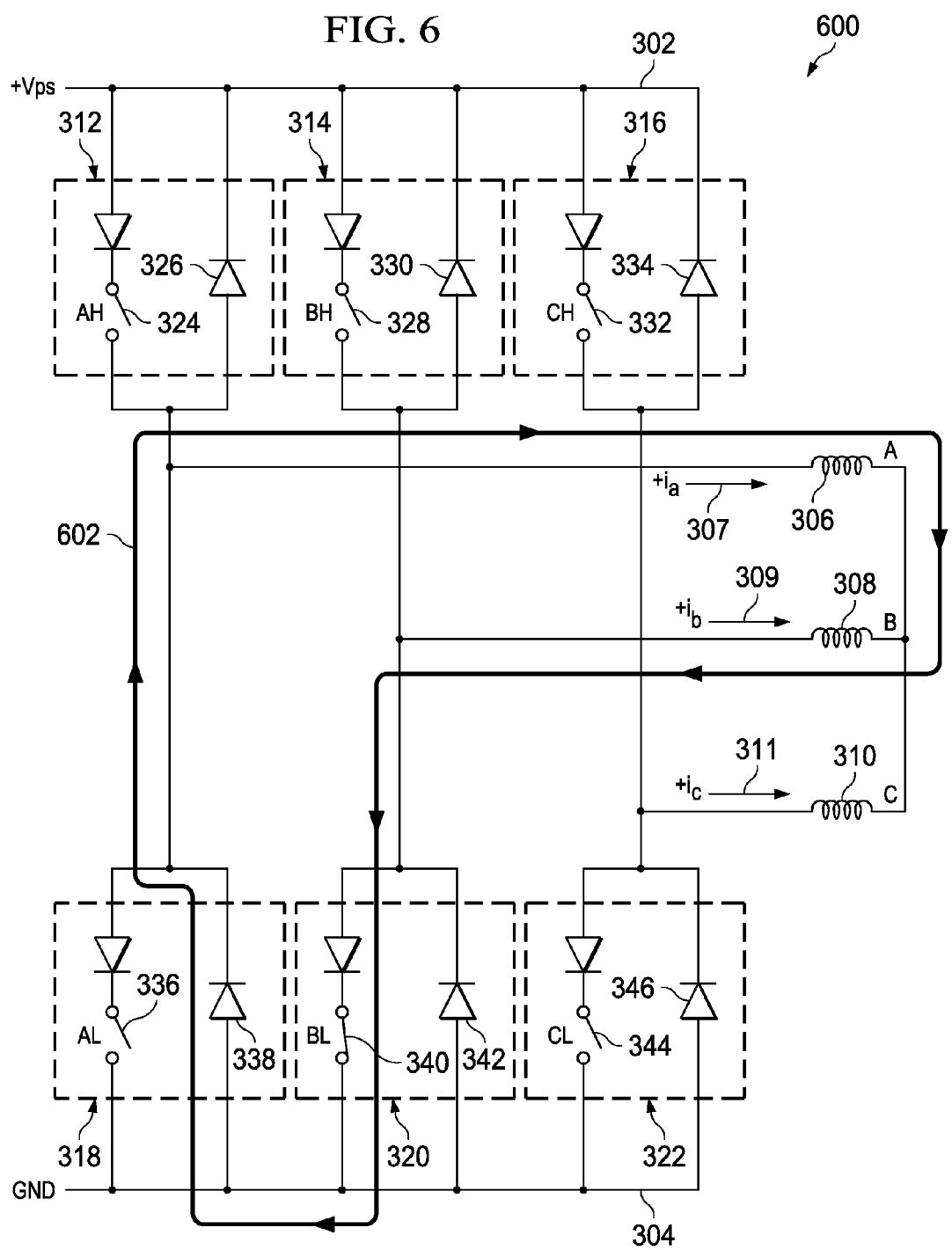
FIG. 6 is an illustration of a schematic circuit diagram of a switch bridge for controlling current in a motor in a second coasting configuration in accordance with an illustrative embodiment.

Turning to FIG. 6, an illustration of a schematic circuit diagram of a switch bridge for controlling current in a motor in a second coasting configuration is depicted in accordance with an illustrative embodiment. In this example, switch bridge 600 is another example configuration of switch bridge 300 in FIG. 3.

In this example, switch BL 340 is closed to provide the coasting configuration for switch bridge 600. Assuming an existing positive current in windings 306 in the direction of arrow 307, closing switch BL 340 creates a short circuit through switch bridge 600 for the existing current in windings 306. The resulting current 602 in switch bridge 600 runs from windings 306 through closed switch BL 340, through diode 338 in switching unit 318, and back to windings 306 in the positive direction of arrow 307. The existing current in windings 306 may remain relatively constant with switch bridge 600 in coasting configuration.

With switch bridge 600 in coasting configuration the existing current in windings 306 may decrease by a relatively small amount due to resistance and similar losses in switch bridge 600 and windings 306 and windings 308. For example, without limitation, the coasting configuration for switch bridge 600 may be used in response to an indication from a motor controller that the current in the positive direction of arrow 307 in windings 306 should be maintained at the present level.

The coasting configurations of switch bridge 500 in FIG. 5 and switch bridge 600 in FIG. 6 are alternative configurations for coasting a current in the positive direction of arrow 307 in windings 306. In accordance with an illustrative embodiment, both alternative configurations may be used during a switching cycle in which coasting the positive current in the direction of arrow 307 in windings 306 is called for. For example, during a switching cycle in which coasting the positive current in windings 306 is called for, switch AH 324 may be closed and switch BL 340 opened to implement coasting configuration for switch bridge 500 in FIG. 5 for a portion of the switching cycle. Switch AH 324 then may be opened and switch BL 340 closed to implement coasting configuration for switch bridge 600 in FIG. 6, during another portion of the switching cycle.

Switching between different coasting configurations in this manner shares the burden of carrying the coasting current between different components of the switch bridge each switching cycle. Therefore, switching between different coasting configurations in this manner may reduce undesired heating of components in the switch bridge resulting from carrying the coasting current.

Figure 7:
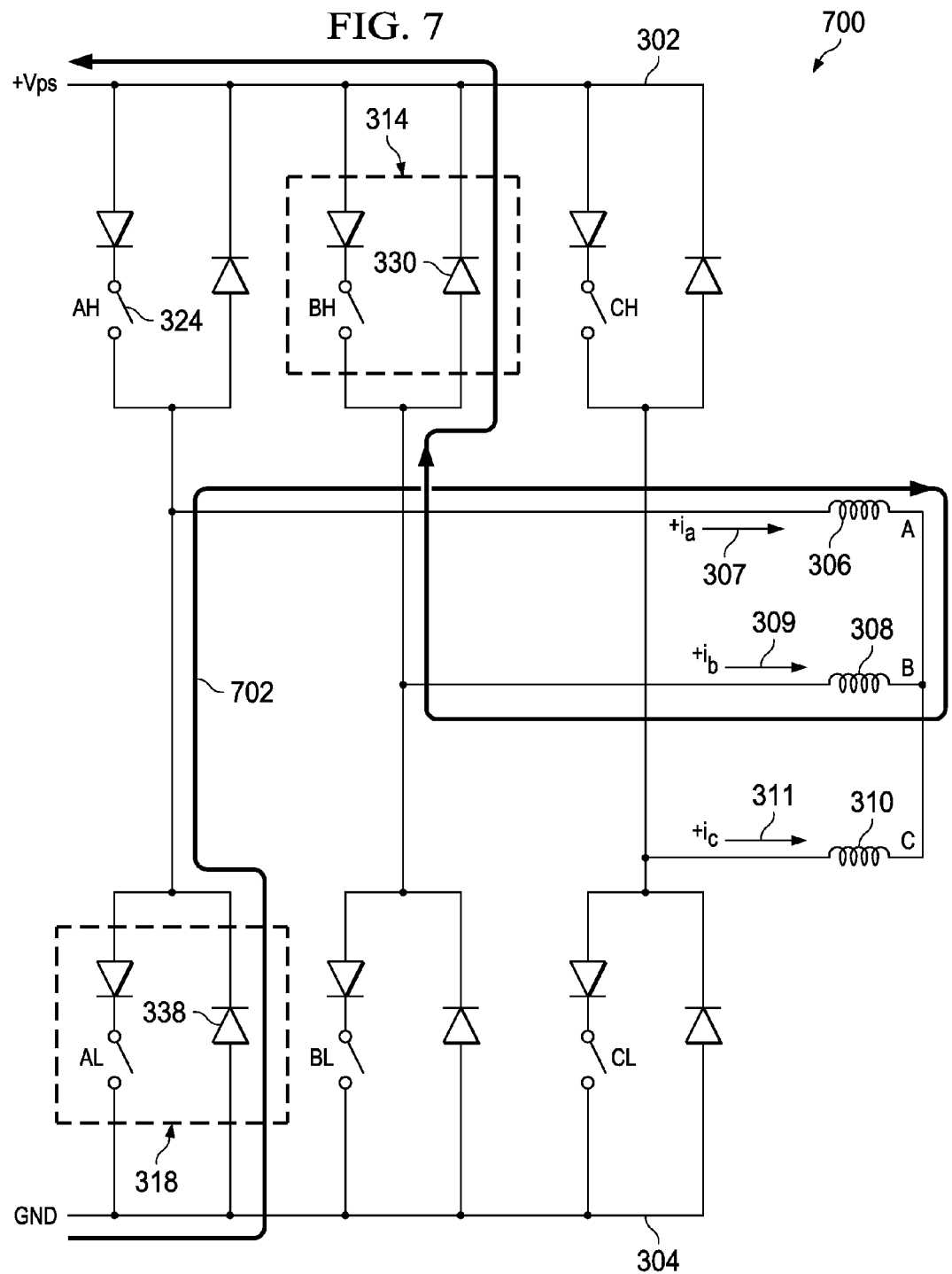
FIG. 7 is an illustration of a schematic circuit diagram of a switch bridge for controlling current in a motor in a regenerating configuration in accordance with an illustrative embodiment.

Turning to FIG. 7, an illustration of a schematic circuit diagram of a switch bridge for controlling current in a motor in a regenerating configuration is depicted in accordance with an illustrative embodiment. In this example, switch bridge 700 is another example configuration of switch bridge 300 in FIG. 3.

In this example, the regenerating configuration of switch bridge 700 comprises opening all of the switches in switch bridge 700. Assuming an existing positive current in windings 306 in the direction of arrow 307, opening all of the switches in switch bridge 700 will result in regenerating current 702.

Regenerating current 702 runs in the direction from ground 304 through diode 338, in the positive direction of arrow 307 through windings 306, and through diode 330 to line 302. Regenerating current 702 returns the energy in windings 306 back to the DC power source via line 302, thereby decreasing the current in windings 306. For example, without limitation, the regenerating configuration for switch bridge 700 may be used in response to an indication from a motor controller that the current in the positive direction of arrow 307 in windings 306 should be decreased.

Figure 8:
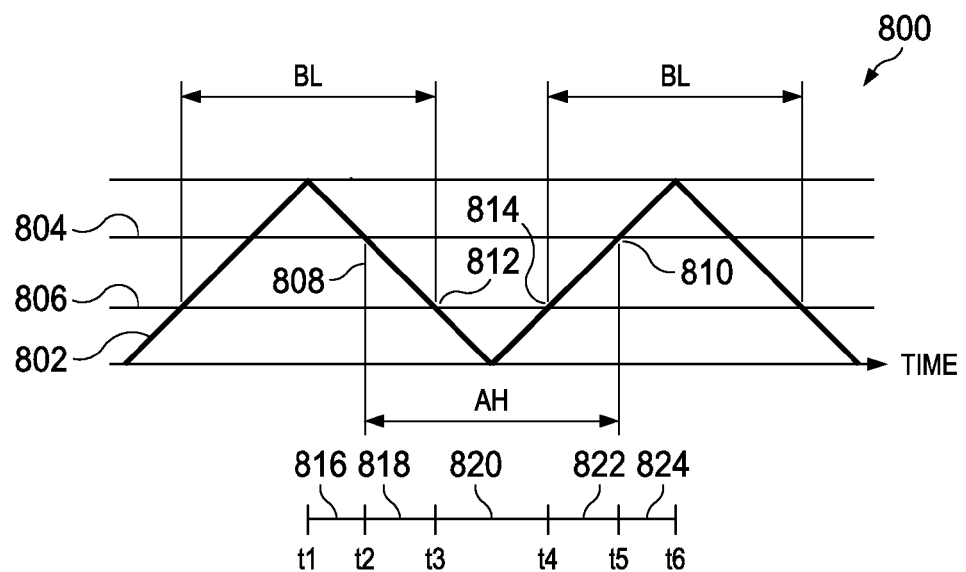
FIG. 8 is an illustration of switch timing for a switching cycle providing driving and coasting current for a motor in accordance with an illustrative embodiment.
Figure 9:
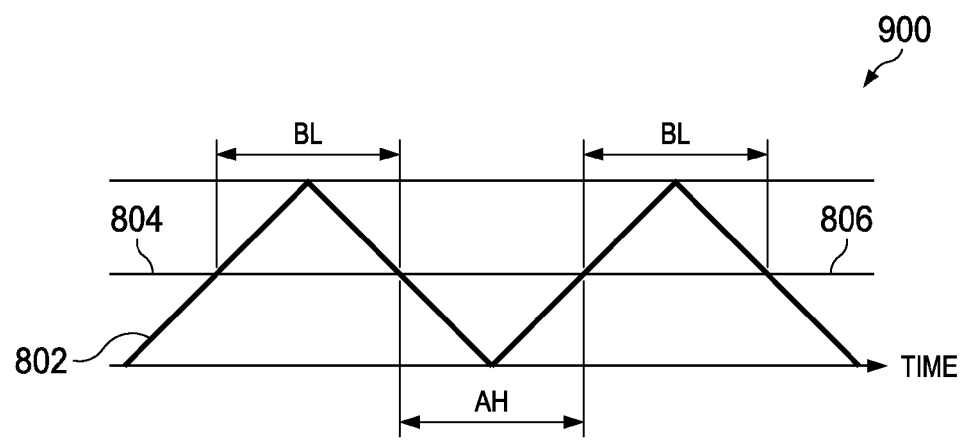
FIG. 9 is an illustration of switch timing for a switching cycle providing only coasting current for a motor in accordance with an illustrative embodiment.
Figure 10:
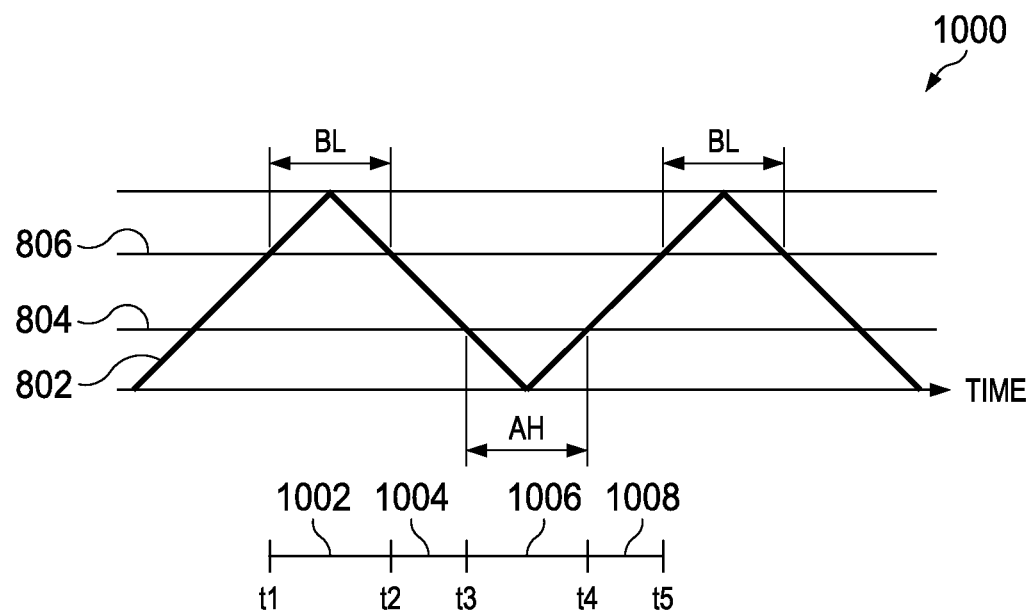
FIG. 10 is an illustration of switch timing for a switching cycle providing coasting and regenerating current for a motor in accordance with an illustrative embodiment.

Turning to FIGS. 8-10, switch timing in various switching cycles for controlling the switches in a switch bridge for driving, coasting, and regenerating the current in the windings of a motor are depicted in accordance with an illustrative embodiment. The example switching cycles in FIGS. 8-10 are for driving, coasting, and regenerating the current in one set of windings of a motor operating in a first quadrant of operation. Switching cycles for controlling the switches in a switch bridge for driving, coasting, and regenerating the current in other windings of the motor and for other quadrants of operation will be known to those skilled in the art based on the detailed description and examples of illustrative embodiments as presented herein. References to particular switches in FIGS. 8-10 are references to corresponding switches in switch bridge 300 in FIG. 3.

Turning to FIG. 8, an illustration of switch timing for a switching cycle providing driving and coasting current for a motor is depicted in accordance with an illustrative embodiment. In this example, switching cycle 800 may be an example of one implementation of switching cycle 224 implemented in switch controller 206 for controlling the switches in switch bridge 202 in FIG. 2 or in switch bridge 300 in FIG. 3.

Switching cycle 800 may be defined with reference to triangle wave 802. The frequency of triangle wave 802 may define the frequency of switching cycle 800. In accordance with an illustrative embodiment, switches in a switch bridge may be opened and closed during each switching cycle to provide the desired driving, coasting, and regenerating current for the windings of a motor, as defined by a motor controller. Therefore, the frequency of triangle wave 802 also may define the switching frequency of the switches in the switch bridge. The frequency of triangle wave 802, and, therefore, the frequency of switching cycle 800, may be selected in any appropriate manner.

In this example, the position of line 804 with respect to triangle wave 802 may define the timing of the switching of switch AH in a switch bridge during switching cycle 800. For example, switch AH may be closed at point 808, where triangle wave 802 is falling and crosses line 804. Switch AH may be opened at point 810, where triangle wave 802 is rising and crosses line 804. Similarly, the position of line 806 with respect to triangle wave 802 may define the timing of the switching of switch BL in the switch bridge during switching cycle 800. For example, switch BL may be opened at point 812, where triangle wave 802 is falling and crosses line 806. Switch BL may be closed at point 814, where triangle wave 802 is rising and crosses line 806.

As will be seen, the positions of line 804 and line 806 with respect to triangle wave 802 may define how much time during each switching cycle a switch bridge is configured for driving, coasting, or regenerating current in the windings of a motor. Therefore, the positions of line 804 and line 806 with respect to triangle wave 802 may be adjusted by a motor controller as appropriate to achieve the desired current in the motor windings. For example, without limitation, the positions of line 804 and line 806 with respect to triangle wave 802 may be adjusted in response to the output from a feedback controller, such as output 214 from feedback controller 204 in FIG. 2.

In this example, a complete period of switching cycle 800 may run from time $t_1$ to time $t_6$. During time period 816, from time $t_1$ to time $t_2$, switch BL in the switch bridge is closed and switch AH in the switch bridge is open. Therefore, during time period 816, the switch bridge may be configured for coasting current as illustrated in FIG. 6. Switch AH is closed at time $t_2$. During time period 818, from time $t_2$ to time $t_3$, both switch BL and switch AH are closed. Therefore, during time period 818, the switch bridge may be configured for driving current as illustrated in FIG. 4.

Switch BL is opened at time $t_3$. During time period 820, from time $t_3$ to time $t_4$, switch BL is open and switch AH is closed. Therefore, during time period 820, the switch bridge may be configured for coasting current as illustrated in FIG. 5. At time $t_4$, switch BL is closed again. During time period 822, from time $t_4$ to time $t_5$, both switch BL and switch AH are closed and the switch bridge is again configured for driving as in time period 818. At time $t_5$, switch AH is opened. During time period 824, from time $t_5$ to time $t_6$, switch BL is closed and switch AH is open and the switch bridge is again configured for coasting as in time period 816.

In this example, the switch bridge is configured for driving current for approximately half of the time during switching cycle 800. During the other half of the time during switching cycle 800 the switch bridge is configured for coasting. Therefore, for example, without limitation, the duty cycle for switching cycle 800 may be referred to as a 50% duty cycle or a +50% duty cycle.

The output from a feedback controller may define the desired duty cycle for switching of the switches in a switch bridge as a single signed value in the range from 1 to −1. In this case, for example, without limitation, the switches in the switch bridge may be controlled as described for switching cycle 800 in response to an output value of 0.5 from the feedback controller.

Turning to FIG. 9, an illustration of switch timing for a switching cycle providing only coasting current for a motor is depicted in accordance with an illustrative embodiment. In this example, switching cycle 900 may be an example of one implementation of switching cycle 224 implemented in switch controller 206 for controlling the switches in switch bridge 202 in FIG. 2 or in switch bridge 300 in FIG. 3.

In this example, both line 804, defining the timing of the switching of switch AH in the switch bridge, and line 806, defining the timing of the switching of switch BL in the switch bridge, are positioned halfway between the peaks of triangle wave 802. In this case, switch BL is opened at the same time that switch AH is closed and switch AH is opened at the same time that switch BL is closed during switching cycle 900. Each switch AH and BL is opened and closed one time during the period of switching cycle 900.

Therefore, in this example, switch BL is closed and switch AH is open for approximately half of the time during switching cycle 900. During this time, the switch bridge may be configured for coasting current as illustrated in FIG. 6. Switch BL is open and switch AH is closed for the other half of the time during switching cycle 900. During this time the switch bridge may be configured for coasting current as illustrated in FIG. 5.

The switch bridge is thus configured for coasting current for approximately all of the time during switching cycle 900. Therefore, for example, without limitation, the duty cycle for switching cycle 900 may be referred to as a 0% duty cycle. The output from a feedback controller may define the desired duty cycle for switch bridge switching as a single signed value in the range from 1 to −1. In this case, for example, without limitation, the switches in the switch bridge may be controlled as described for switching cycle 900 in response to an output value of 0 from the feedback controller.

Turning to FIG. 10, an illustration of switch timing for a switching cycle providing coasting and regenerating current for a motor is depicted in accordance with an illustrative embodiment. In this example, switching cycle 1000 may be another example of one implementation of switching cycle 224 implemented in switch controller 206 for controlling the switches in switch bridge 202 in FIG. 2 or in switch bridge 300 in FIG. 3. As in previous examples, the positions of lines 804 and 806 with respect to triangle wave 802 may define the timing of the switching of switches AH and BL, respectively, in a switch bridge during switching cycle 1000.

In this example, a complete period of switching cycle 1000 may run from time $t_1$ to time $t_5$. During time period 1002, from time $t_1$ to time $t_2$, switch BL in the switch bridge is closed and switch AH in the switch bridge is open. Therefore, during time period 1002 the switch bridge may be configured for coasting current as illustrated in FIG. 6. Switch BL is opened at time $t_2$, when triangle wave 802 is falling and crosses line 806.

During time period 1004, from time $t_2$ to time $t_3$, both switch BL and switch AH are open. Therefore, during time period 1004 the switch bridge may be configured for regenerating current as illustrated in FIG. 7. Switch AH is closed at time $t_3$, when triangle wave 802 is falling and crosses line 804. During time period 1006, from time $t_3$ to time $t_4$, switch BL is open and switch AH is closed. Therefore, during time period 1006 the switch bridge may be configured for coasting current as illustrated in FIG. 5. At time $t_4$, switch AH is opened when triangle wave 802 is rising and crosses line 804. During time period 1008, from time $t_4$ to time $t_5$, both switch BL and switch AH are open and the switch bridge is again configured for regenerating as in time period 1004.

In this example, the switch bridge is configured for regenerating current for approximately half of the time during switching cycle 1000. During the other half of the time during switching cycle 1000, the switch bridge is configured for coasting. Regenerating current is in the opposite direction to driving current in a motor. Therefore, for example, without limitation, the duty cycle for switching cycle 1000 may be referred to as a −50% duty cycle.

The output from a feedback controller may define the desired duty cycle for the switching of the switch bridge as a single signed value in the range from 1 to −1. In this case, for example, without limitation, the switches in the switch bridge may be controlled as described for switching cycle 1000 in response to an output value of −0.5 from the feedback controller.

Figure 11:
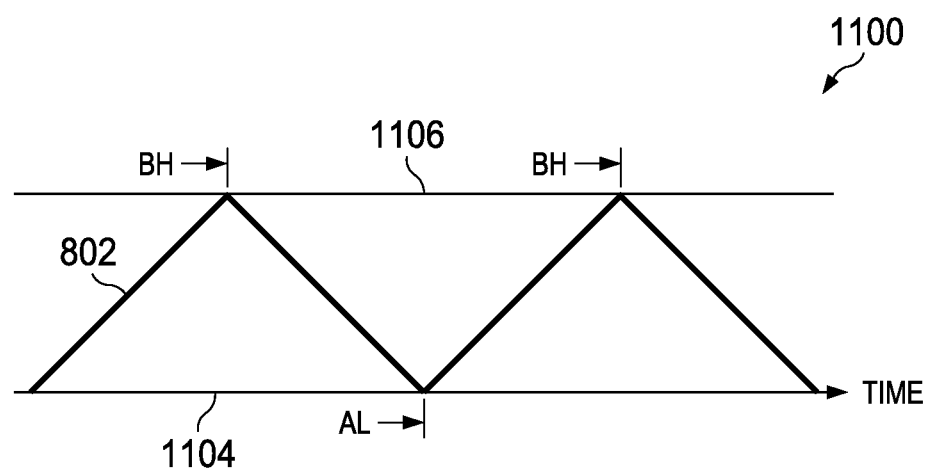
FIG. 11 is an illustration of switch timing for a switching cycle providing only regenerating current for a motor in accordance with an illustrative embodiment.

Turning to FIG. 11, an illustration of switch timing for a switching cycle providing only regenerating current for a motor is depicted in accordance with an illustrative embodiment. In this example, switching cycle 1100 may be another example of one implementation of switching cycle 224 implemented in switch controller 206 for controlling the switches in switch bridge 202 in FIG. 2 or switch bridge 300 in FIG. 3.

The example switching cycles in FIGS. 8-10 are for controlling the current in one set of windings of a motor operating in the first quadrant of operation. In contrast, switching cycle 1100 is an example of a switching cycle for controlling the current in the same set of windings of the motor when the motor is operating in the fourth quadrant of operation.

The directions of currents in the windings for driving, coasting, and regenerating in the fourth quadrant of operation may be opposite to the directions of the currents in the windings for driving, coasting, and regenerating in the first quadrant of operation. Therefore, the switches in the switch bridge that are controlled during a switching cycle in the fourth quadrant of operation may be different from the switches in the switch bridge that are controlled during a switching cycle in the first quadrant of operation to provide the desired driving, coasting, and regenerating currents for motor operation in the fourth quadrant that are in the opposite direction to the currents for motor operation in the first quadrant.

For example, in FIGS. 8-10 switches AH and BL in a switch bridge are controlled during a switching cycle to control the current in the motor windings for a motor operating in the first quadrant. In contrast, switches AL and BH in the switch bridge are controlled during switching cycle 1100 to control the current in the same windings for the motor operating in the fourth quadrant.

In this example, the position of line 1104 with respect to triangle wave 802 may define the timing of the switching of switch AL in the switch bridge during switching cycle 1100. For example, switch AL may be closed when triangle wave 802 is falling and crosses line 1104 and may be opened when triangle wave 802 is rising and crosses line 1104. Similarly, the position of line 1106 with respect to triangle wave 802 may define the timing of the switching of switch BH in the switch bridge during switching cycle 1100. For example, switch BH may be closed when triangle wave 802 is climbing and crosses line 1106 and may be opened when triangle wave 802 is falling and crosses line 1106.

The positions of line 1104 and line 1106 with respect to triangle wave 802, thus, may define how much time during each switching cycle the switch bridge is configured for driving, coasting, or regenerating current in the windings of a motor. Therefore, the positions of line 1104 and line 1106 with respect to triangle wave 802 may be adjusted by a motor controller as appropriate to achieve the desired current in the motor windings. For example, without limitation, the positions of line 1104 and line 1106 with respect to triangle wave 802 may be adjusted in response to the output from a feedback controller, such as output 214 from feedback controller 204 in FIG. 2.

In this example, line 1104 and line 1106 are positioned at opposite peaks of triangle wave 802 such that triangle wave 802 never crosses lines 1104 and 1106. In this case, switches AL and BH may both remain open throughout switching cycle 1100. Therefore, the switch bridge may be configured for providing only regenerating current in the motor windings for all of switching cycle 1100.

Currents in the motor windings during operation of the motor in the fourth quadrant of operation are in the opposite direction to currents in the motor windings during operation of the motor in the first quadrant of operation. Therefore, regenerating current in the windings during operation of the motor in the fourth quadrant of operation is in the same direction as driving current in the windings during operation of the motor in the first quadrant of operation. Therefore, for example, without limitation, the duty cycle for switching cycle 1100, in which the switch bridge is configured for regenerating current in the motor windings for approximately all of the time of switching cycle 1100, may be referred to as a 100% duty cycle.

The output from a feedback controller may define the desired duty cycle for switching of the switches in a switch bridge as a single signed value in the range from 1 to −1. In this case, for example, without limitation, the switches in the switch bridge may be controlled as described for switching cycle 1100 during operation of a motor in the fourth quadrant of operation in response to an output value of 1 from the feedback controller.

Figure 12:
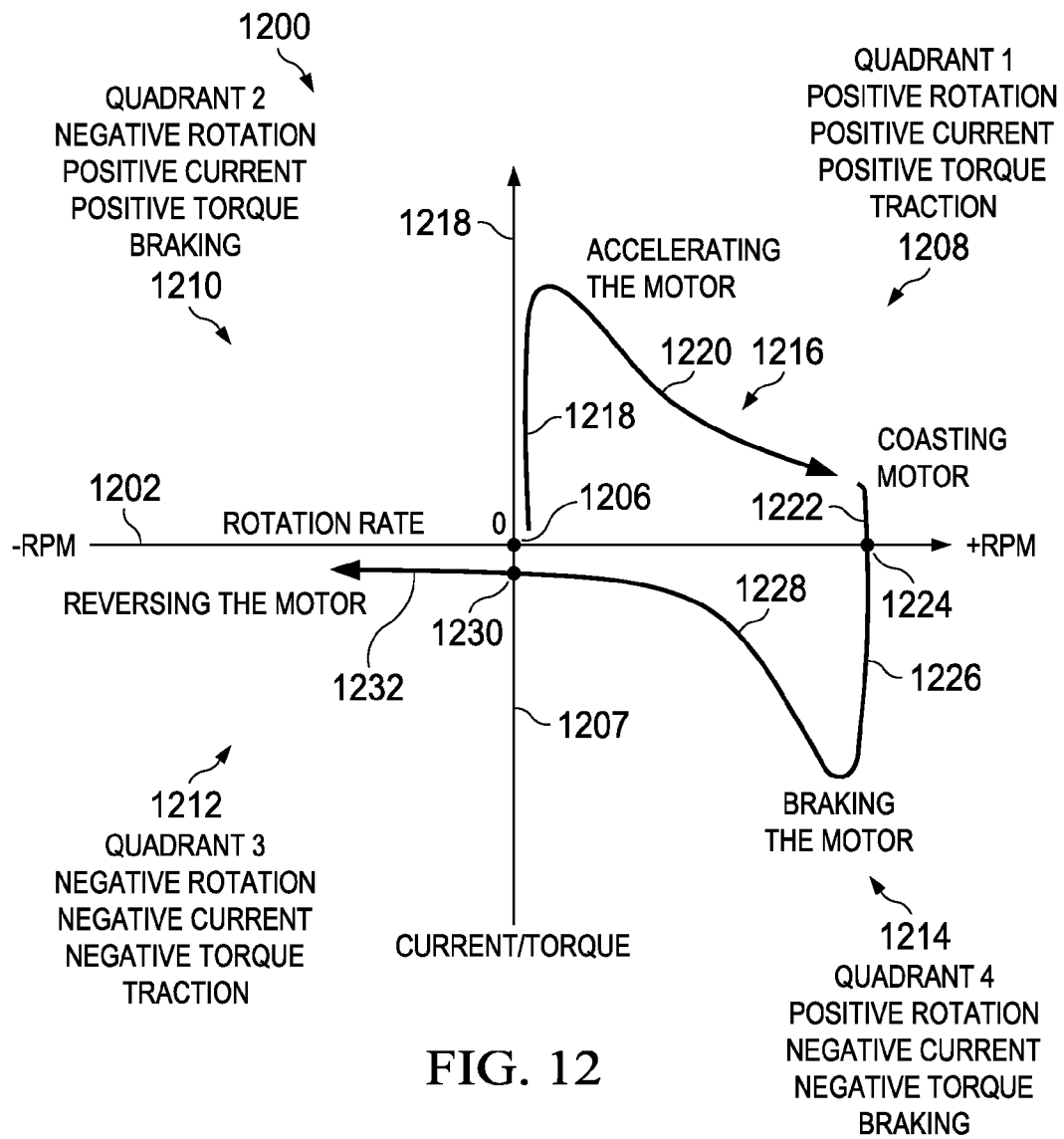
FIG. 12 is an illustration of the quadrants of operation of a motor in accordance with an illustrative embodiment.

Turning to FIG. 12, an illustration of the quadrants of operation of a motor are depicted in accordance with an illustrative embodiment. In this example, quadrants of operation 1200 of a motor may be examples of quadrants of operation of motor 101 in FIG. 1. Quadrants of operation 1200 may be defined with reference to the rotation rate of the motor and the current in the motor windings.

In this example, the rotation rate of the motor is identified with reference to horizontal axis 1202. For example, without limitation, the rotation rate of the motor may be the speed of the rotor expressed in revolutions per minute, RPM, or using any other appropriate units for indicating how fast the rotor is spinning.

The rotation rate of the motor at point 1206 on horizontal axis 1202 is zero. Therefore, point 1206 on horizontal axis 1202 corresponds to no rotation of the motor in either direction.

Points to the right of point 1206 on horizontal axis 1202 correspond to rotation of the motor in a first direction of rotation. Points further to the right of point 1206 on horizontal axis 1202 correspond to faster rotation of the motor in the first direction of rotation. For example, without limitation, points to the right of point 1206 on horizontal axis 1202 may correspond to rotation of the motor in a clockwise direction. Points to the right of point 1206 on horizontal axis 1202 may be identified by positive numbers. Therefore, rotation of the motor in the first direction of rotation may be referred to as positive rotation.

Points to the left of point 1206 on horizontal axis 1202 correspond to rotation of the motor in a second direction of rotation. Points further to the left of point 1206 on horizontal axis 1202 correspond to faster rotation of the motor in the second direction of rotation. The second direction of rotation may be referred to as the opposite direction of rotation with respect to the first direction of rotation.

Similarly, the first direction of rotation may be referred to as the opposite direction of rotation with respect to the second direction of rotation. For example, without limitation, points to the left of point 1206 on horizontal axis 1202 may correspond to rotation of the motor in a counter-clockwise direction. Points to the left of point 1206 on horizontal axis 1202 may be identified by negative numbers. Therefore, rotation of the motor in the second direction of rotation may be referred to as negative rotation.

In this example, the current in the windings of the motor is identified with reference to vertical axis 1207. For example, without limitation, the current in the motor windings may be identified using any appropriate units of current. The direction and magnitude of torque produced by the motor may vary directly with the direction and magnitude of current in the motor windings. Therefore, the current in the motor windings also may be identified using any appropriate units of torque. In this case, the torque produced by the motor may be identified with reference to vertical axis 1207 and quadrants of operation 1200 may be defined with reference to the rotation rate of the motor and the torque produced by the motor.

The current in the motor windings and torque produced by the motor at point 1206 on vertical axis 1207 is zero. Therefore, point 1206 on vertical axis 1207 corresponds to no current in the motor windings in either direction and no torque produced by the motor in either direction.

Points above point 1206 on vertical axis 1207 correspond to current in the motor windings in a first current direction and torque produced by the motor in the first direction of rotation. Points further above point 1206 on vertical axis 1207 correspond to greater magnitudes of current in the first current direction and greater torque in the first direction of rotation. For example, without limitation, points above point 1206 on vertical axis 1207 may correspond to torque in the clockwise direction. Points above point 1206 on vertical axis 1207 may be identified by positive numbers. Therefore, current in the first current direction may be referred to as positive current or current in a positive direction and torque in the first direction of rotation may be referred to as positive torque.

Points below point 1206 on vertical axis 1207 correspond to current in the motor windings in a second current direction and torque produced by the motor in the second direction of rotation. Points further above point 1206 on vertical axis 1207 correspond to greater magnitudes of current in the second current direction and greater torque in the second direction of rotation. The second current direction may be referred to as the opposite direction of current with respect to the first current direction.

Similarly, the first current direction may be referred to as the opposite direction of current with respect to the second current direction. For example, without limitation, points below point 1206 on vertical axis 1207 may correspond to torque in the counter-clockwise direction. Points below point 1206 on vertical axis 1207 may be identified by negative numbers. Therefore, current in the second current direction may be referred to as negative current or current in a negative direction and torque in the second direction of rotation may be referred to as negative torque.

A motor may be operating in quadrant 1 1208 when the motor is rotating in the first direction of rotation and the current in the windings of the motor is in the first current direction to produce torque in the first direction of rotation. Therefore, in this example, operation of the motor in quadrant 1 1208 may be characterized by positive rotation, positive current, and positive torque.

The motor may be operating in quadrant 2 1210 when the motor is rotating in the second direction of rotation and the current in the windings of the motor is in the first current direction to produce torque in the first direction of rotation. Therefore, in this example, operation of the motor in quadrant 2 1210 may be characterized by negative rotation, positive current, and positive torque.

The motor may be operating in quadrant 3 1212 when the motor is rotating in the second direction of rotation and the current in the windings of the motor is in the second current direction to produce torque in the second direction of rotation. Therefore, in this example, operation of the motor in quadrant 3 1212 may be characterized by negative rotation, negative current, and negative torque.

The motor may be operating in quadrant 4 1214 when the motor is rotating in the first direction of rotation and the current in the windings of the motor is in the second current direction to produce torque in the second direction of rotation. Therefore, in this example, operation of the motor in quadrant 4 1214 may be characterized by positive rotation, negative current, and negative torque.

In quadrant 1 1208 and quadrant 3 1212 the current in the motor windings produces torque that is in the same direction as the direction of rotation of the motor. Therefore, in quadrant 1 1208 and quadrant 3 1212 the torque produced by the motor supports the rotation of the motor. Operation of the motor in quadrant 1 1208 and quadrant 3 1212 may be referred to as traction. The directions of rotation of a motor operating in quadrant 1 1208 and quadrant 3 1212 are reversed. Therefore, quadrant 3 1212 may be referred to as a reverse traction quadrant of operation with respect to quadrant 1 1208. Quadrant 1 1208 may be referred to as a reverse traction quadrant of operation with respect to quadrant 3 1212.

In quadrant 2 1210 and quadrant 4 1214, the current in the motor windings produces torque that is in the direction opposite to the direction of rotation of the motor. Therefore, in quadrant 2 1210 and quadrant 4 1214, the torque produced by the motor opposes the rotation of the motor. Operation of the motor in quadrant 2 1210 and quadrant 4 1214 may be referred to as braking.

In one example, line 1216 illustrates the changing rate of rotation, winding current, and torque of a motor as the motor is operated in several quadrants of operation 1200. Operation of the motor may begin in quadrant 1 1208. Line segment 1218 indicates an initial relatively large increase in the current in the motor windings in the positive direction. This relatively large increase in current produces a corresponding large increase in torque in the first direction of rotation, causing the motor to begin rotating in the first direction of rotation.

Line segment 1220 indicates that the positive current in the windings, and thus the torque in the first direction of rotation, may be maintained to accelerate the rate of rotation of the motor in the first direction of rotation to a desired coasting speed. Line segment 1220 indicates that the magnitude of the positive current, and thus the torque produced in the first direction of rotation, may be reduced gradually after rotation of the motor is started and as the rate of rotation of the motor is accelerated to the desired coasting speed. Line segment 1222 indicates that the magnitude of the positive current in the motor windings, and thus the torque produced in the first direction of rotation, may be reduced further as the rate of rotation of the motor is maintained at the desired coasting speed.

At point 1224, operation of the motor changes from quadrant 1 1208 to quadrant 4 1214. Line segment 1226 indicates a relatively large increase in the current in the motor windings in the negative direction. This relatively large increase in negative current produces a corresponding large increase in torque in the second direction of rotation. The torque produced by the motor now opposes the rotation of the motor, causing the motor to begin braking.

Line segment 1228 indicates that the negative current in the windings, and thus the torque in the second direction of rotation, is maintained to reduce the rate of rotation of the motor in the first direction of rotation. Line segment 1228 indicates that the magnitude of the negative current, and thus the torque produced in the second direction of rotation, may be reduced gradually during braking as the rate of rotation of the motor is reduced.

At point 1230, the operation of the motor changes from quadrant 4 1214 to quadrant 3 1212. At point 1230, the direction of rotation of the motor is reversed from the first direction of rotation to the second direction of rotation. Line segment 1232 indicates that the negative current in the motor windings, and thus the torque produced in the second direction of rotation, may be maintained to accelerate the rate of rotation of the motor in the second direction of rotation.

Figure 13:
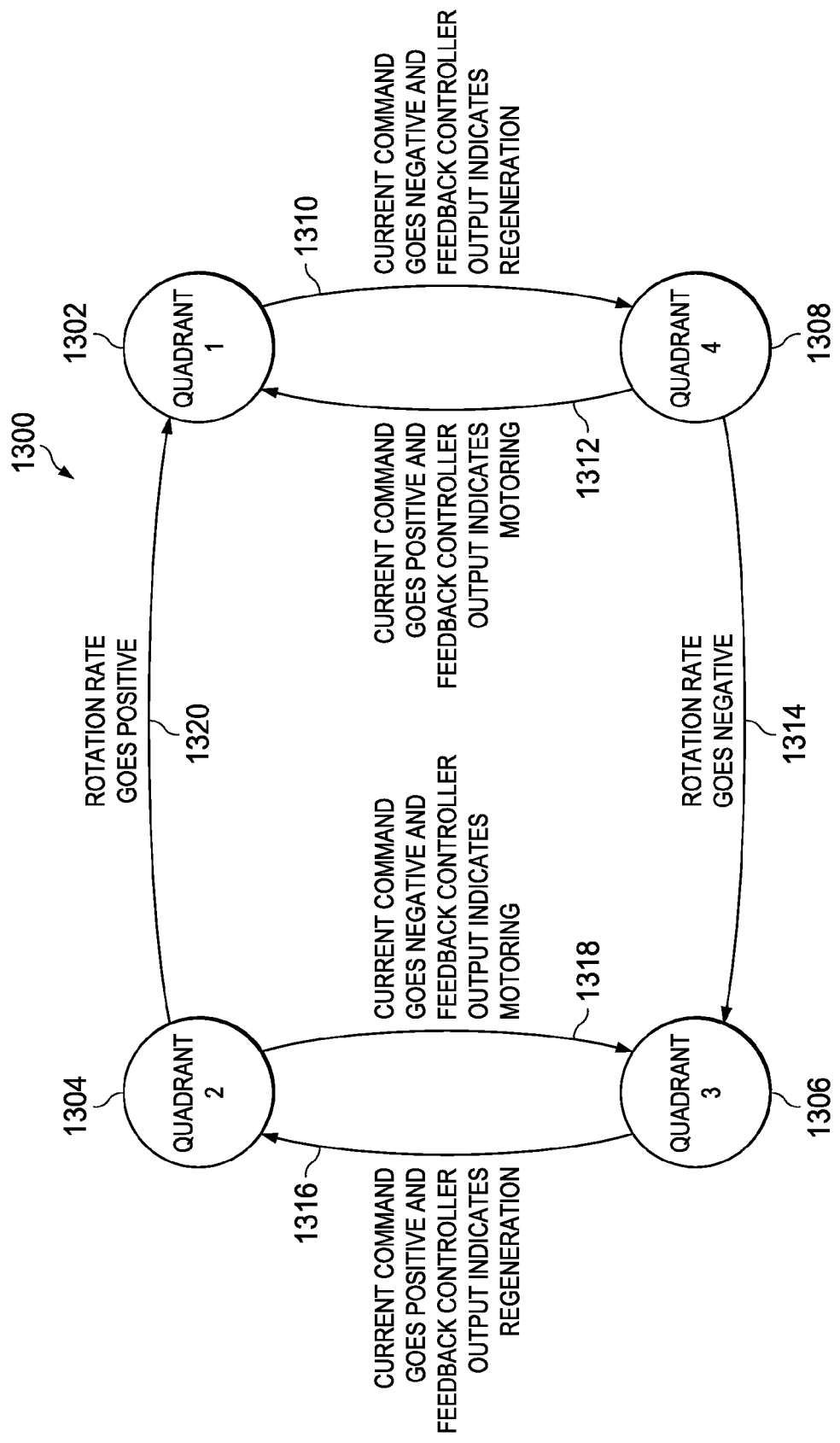
FIG. 13 is a state diagram illustration of changes between the quadrants of operation of a motor in accordance with an illustrative embodiment.

Turning to FIG. 13, a state diagram illustration of changes between the quadrants of operation of a motor is depicted in accordance with an illustrative embodiment. In this example, state diagram 1300 may illustrate an example of one implementation of conditions for changes between quadrants of operation 1200 of a motor in FIG. 12. For example, without limitation, quadrant 1 1302, quadrant 2 1304, quadrant 3 1306, and quadrant 4 1308 may correspond to quadrant 1 1208, quadrant 2 1210, quadrant 3 1212, and quadrant 4 1214, respectively, in FIG. 12.

In this illustrative example, without limitation, the conditions for changes between quadrants of operation of a motor shown in state diagram 1300 may be used by quadrant change identifier 228 in FIG. 2 to identify changes in the quadrant of operation of a motor.

In quadrant 1 1302 the motor may be rotating in a first direction of rotation and the direction of current in the motor windings may cause the motor to produce torque that is also in the first direction of rotation. The rate of rotation of the motor operating in quadrant 1 1302 may be referred to as a positive rotation rate. The direction of current in the motor windings in quadrant 1 1302 may be referred to as positive current.

Operation of the motor may change from quadrant 1 1302 to quadrant 4 1308 when current command goes negative and the feedback controller output indicates regeneration 1310. The current command going negative indicates the desire to reverse the direction of current in the motor windings from positive current to negative current.

When the feedback controller output indicates regeneration, the switching devices in the switch bridge may be controlled to configure the switch bridge for regenerating to reduce any remaining positive current in the motor windings to zero. In the example described above, wherein the output from the feedback controller defines the desired duty cycle for switching of the switch bridge as a single signed value in the range from 1 to −1, the feedback controller output indicating regeneration in this case may be indicated by the feedback controller output going to a negative value.

In quadrant 4 1308, the motor may be rotating in the first direction of rotation but the direction of current in the motor windings now causes the motor to produce braking torque in the second direction of rotation that is opposite to the first direction of rotation. The rate of rotation of the motor operating in quadrant 4 1308 may be referred to as a positive rotation rate, as in quadrant 1 1302. The direction of current in the motor windings in quadrant 4 1308 is in the opposite direction from the current in quadrant 1 1302 and, thus, may be referred to as negative current.

Operation of the motor may change from quadrant 4 1308 back to quadrant 1 1302 when current command goes positive and the feedback controller output indicates motoring 1312. The current command going positive indicates the desire to reverse the direction of current in the motor windings from negative current back to positive current.

When the feedback controller output indicates regeneration, the switching devices in the switch bridge may be controlled to configure the switch bridge for regenerating to reduce any remaining negative current in the motor windings to zero. In the example described above, wherein the output from the feedback controller defines the desired duty cycle for switching of the switch bridge as a single signed value in the range from 1 to −1, the feedback controller output indicating regeneration in this case may be indicated by the feedback controller output going to a positive value.

The operation of the motor may change from quadrant 4 1308 to quadrant 3 1306 when rotation rate goes negative 1314. The rotation rate going negative indicates a change in the direction of rotation of the motor from the first direction of rotation to the second direction of rotation that is opposite to the first direction of rotation.

In quadrant 3 1306, the motor may be rotating in the second direction of rotation and the direction of current in the motor windings may cause the motor to produce torque that is also in the second direction of rotation. The rate of rotation of the motor operating in quadrant 3 1306 may be referred to as a negative rotation rate. The direction of current in the motor windings in quadrant 3 1306 may be referred to as negative current.

The operation of the motor may change from quadrant 3 1306 to quadrant 2 1304 when current command goes positive and the feedback controller output indicates regeneration 1316. The current command going positive indicates the desire to reverse the direction of current in the motor windings from negative current to positive current.

When the feedback controller output indicates regeneration, the switching devices in the switch bridge may be controlled to configure the switch bridge for regenerating to reduce any remaining negative current in the motor windings to zero. In the example described above, wherein the output from the feedback controller defines the desired duty cycle for switch bridge switching as a single signed value in the range from 1 to −1, the feedback controller output indicating regeneration in this case may be indicated by the feedback controller output going to a positive value.

In quadrant 2 1304, the motor may be rotating in the second direction of rotation, but the direction of current in the motor windings now causes the motor to produce braking torque in the first direction of rotation that is opposite to the second direction of rotation. The rate of rotation of the motor operating in quadrant 2 1304 may be referred to as a negative rotation rate, as in quadrant 3 1306. The direction of current in the motor windings in quadrant 2 1304 is in the opposite direction from the current in quadrant 3 1306 and, thus, may be referred to as positive current.

Operation of the motor may change from quadrant 2 1304 back to quadrant 3 1306 when current command goes negative and the feedback controller output indicates motoring 1318. The current command going negative indicates the desire to reverse the direction of current in the motor windings from positive current back to negative current.

When the feedback controller output indicates regeneration, the switching devices in the switch bridge may be controlled to configure the switch bridge for regenerating to reduce any remaining positive current in the motor windings to zero. In the example described above, wherein the output from the feedback controller defines the desired duty cycle for switching of the switch as a single signed value in the range from 1 to −1, the feedback controller output indicating regeneration in this case may be indicated by the feedback controller output going to a negative value.

The operation of the motor may change from quadrant 2 1304 to quadrant 1 1302 when rotation rate goes positive 1320. The rotation rate going positive indicates a change in the direction of rotation of the motor from the second direction of rotation back to the first direction of rotation that is opposite to the second direction of rotation.

In this example, changes back and forth between adjacent traction quadrants of operation and braking quadrants of operation are possible as long as the direction of rotation of the motor does not change. In such changes, the direction of current in the motor windings is changed but the direction of rotation of the motor does not change between quadrant changes. However, in this example, it may not be possible to change back directly to an immediately previous quadrant of operation if the direction of rotation of the motor in the present quadrant of operation is reversed from the direction of rotation of the motor in the immediately previous quadrant of operation. In this case, operation of the motor may be changed through other quadrants of operation to reverse the direction of rotation of the motor again.

In other words, changes between quadrants of operation of the motor are generally in the clockwise direction in the example of state diagram 1300. In some cases, changes between quadrants of operation may be in the counter-clockwise direction. For example, a change from traction in the first direction of rotation in quadrant 1 1302 to braking in the first direction of rotation in quadrant 4 1308 may be followed by a change back to traction in the first direction of rotation in quadrant 1 1302. Similarly, a change from traction in the second direction of rotation in quadrant 3 1306 to braking in the second direction of rotation in quadrant 2 1304 may be followed by a change back to traction in the first direction of rotation in quadrant 3 1306.

However, once operation of the motor has changed from rotation in the first direction of rotation in quadrant 4 1308 to rotation in the second direction of rotation in quadrant 3 1306, the only way back to rotation in the first direction of rotation in quadrant 1 1302 is via changing to quadrant 2 1304. Similarly, once operation of the motor has changed from rotation in the second direction of rotation in quadrant 2 1304 to rotation in the first direction of rotation in quadrant 1 1302, the only way back to rotation in the second direction of rotation in quadrant 3 1306 is via changing to quadrant 4 1308.

It may be noted that the changes between quadrant 1 1302, quadrant 4 1308, and quadrant 3 1306 in state diagram 1300 are the reciprocal of the changes between quadrant 3 1306, quadrant 2 1304, and quadrant 1 1302 in state diagram 1300. In other words, the changes between quadrant 1 1302, quadrant 4 1308, and quadrant 3 1306 in state diagram 1300 and the changes between quadrant 3 1306, quadrant 2 1304, and quadrant 1 1302 in state diagram 1300 are substantially the same except that the current directions and directions of rotation are reversed in these two sets of changes between quadrants of operation.

A change in the quadrant of operation of a motor from quadrant 1 1302 to quadrant 4 1308 may be referred to as a first quadrant change. In this case, a change in the quadrant of operation of the motor from quadrant 4 1308 back to quadrant 1 1302 may be referred to as a second quadrant change. Alternatively, a change in the quadrant of operation of the motor from quadrant 4 1308 to quadrant 3 1306 may be referred to as a second quadrant change. Similarly, a change in the quadrant of operation of a motor from quadrant 3 1306 to quadrant 2 1304 may be referred to as a first quadrant change. In this case, a change in the quadrant of operation of the motor from quadrant 2 1304 back to quadrant 3 1306 may be referred to as a second quadrant change. Alternatively, a change in the quadrant of operation of the motor from quadrant 2 1304 to quadrant 1 1302 may be referred to as a second quadrant change.

Figure 14:
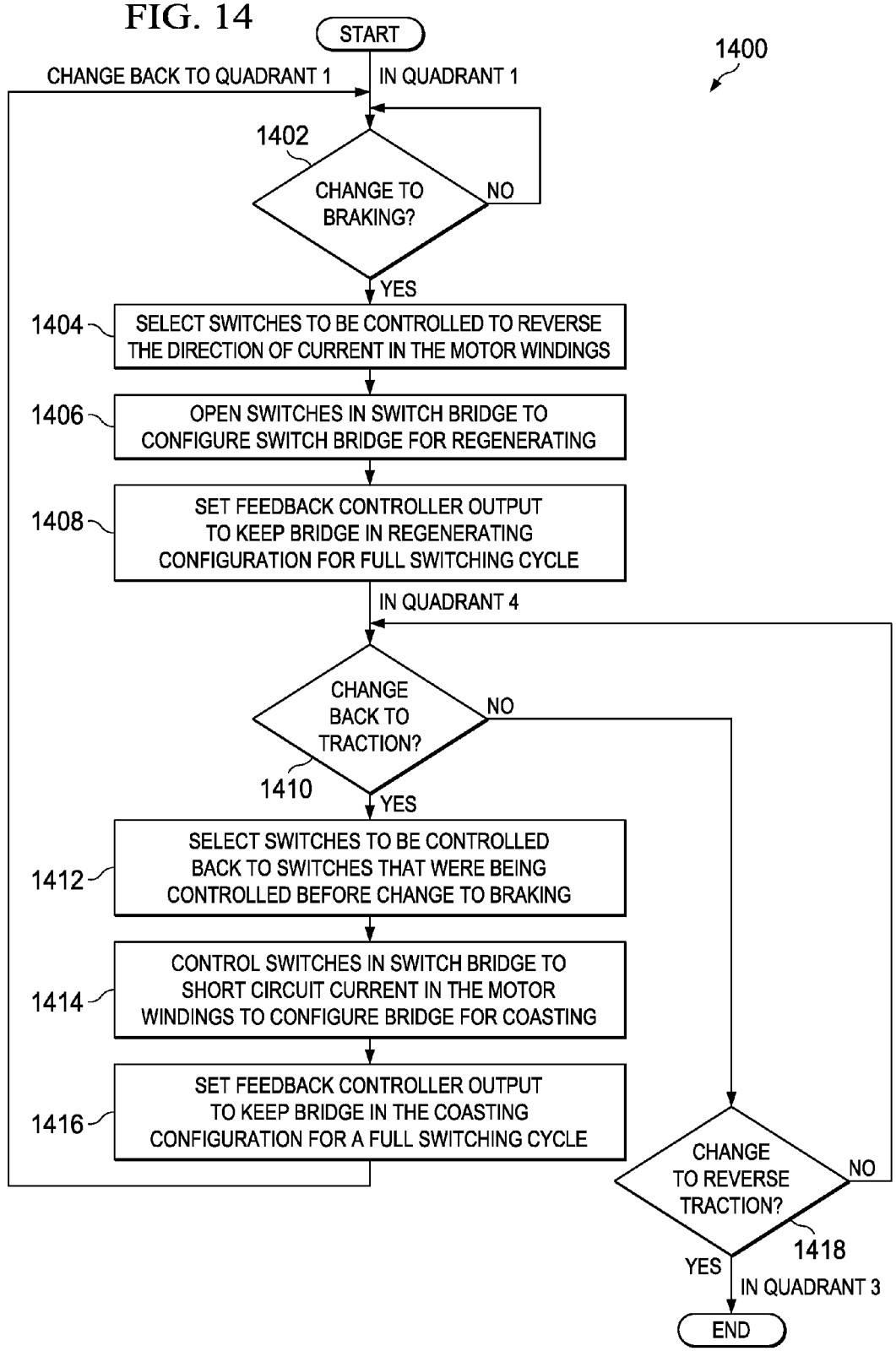
FIG. 14 is an illustration of a flowchart of a process for controlling current in a brushless DC motor to change the quadrant of operation of the motor in accordance with an illustrative embodiment.

Turning to FIG. 14, an illustration of a flowchart of a process for controlling current in a brushless DC motor to change the quadrant of operation of the motor is depicted in accordance with an illustrative embodiment. As depicted, process 1400 may be an example of a process implemented in quadrant change controller 208 in FIG. 2.

Process 1400 may start with the motor operating in a traction quadrant of operation in which the motor is rotating in a first direction of rotation and the current in the motor windings is in a first current direction for producing torque in the motor that is also in the first direction of rotation. For example, without limitation, process 1400 may start with a motor operating in quadrant 1 1208 in FIG. 12 or in quadrant 1 1302 in FIG. 13.

It may be determined whether the quadrant of operation of the motor is to change from the traction quadrant of operation to a braking quadrant of operation (step 1402). For example, a change from the traction quadrant of operation to the braking quadrant of operation may be identified in response to a current command indicating that the direction of current in the motor windings should be reversed and the output from the feedback controller for the motor indicating that the switching devices in the switch bridge for the motor may be controlled to configure the switch bridge for regenerating the present current in the motor windings.

For example, without limitation, a current command indicating that the direction of the current in the motor windings should be reversed may be indicated by the current command changing from calling for a positive current in the motor windings to the current command calling for a negative current in the motor windings. In the example described above, wherein the output from the feedback controller defines the desired duty cycle for switch bridge switching as a single signed value in the range from 1 to −1, the feedback controller output indicating that the switch bridge is configured for regenerating in this case may be indicated by the feedback controller output going to a negative value. Step 1402 may be repeated in response to a determination that the quadrant of operation of the motor is not to change from the tracking quadrant of operation to a braking quadrant of operation.

In response to a determination that the quadrant of operation of the motor is to change from the traction quadrant of operation to the braking quadrant of operation, the switches in the switch bridge that are to be controlled to control the current in the windings of the motor may be selected to reverse the direction of current in the motor windings (step 1404). The switches in the switch bridge then may be opened to configure the switch bridge for regenerating (step 1406). The output of the feedback controller may be set to keep the switches in the switch bridge open to configure the switch bridge for regenerating for a full switching cycle (step 1408).

Steps 1406 and 1408 may be performed as parts of the same operation or as separate operations. In the example described above, wherein the output from the feedback controller defines the desired duty cycle for switching of the switch bridge as a single signed value in the range from 1 to −1, the feedback controller output for configuring the switch bridge for regenerating for a full duty cycle in this case may be set to 1. For example, switching cycle 1100 in FIG. 11 may be an example of switch timing for the switches in the switch bridge as a result of setting the output of the feedback controller in step 1408. After the output of the feedback controller is set in step 1408, the feedback controller may be allowed to operate to adjust the output of the feedback controller to control the current in the windings of the motor in a normal manner.

In response to step 1408, the motor may be operating in a braking quadrant of operation in which the motor is rotating in the first direction of rotation but the current in the motor windings is in a second current direction that is opposite to the first current direction. The current in the motor windings in the second current direction produces torque in the motor in a second direction of rotation that is opposite to the first direction of rotation. For example, without limitation, in response to step 1408, the motor may be operating in quadrant 4 1214 in FIG. 12 or in quadrant 4 1308 in FIG. 13.

It then may be determined whether the quadrant of operation of the motor is to change back from the braking quadrant of operation to the traction quadrant of operation (step 1410). For example, a change from the braking quadrant of operation back to the traction quadrant of operation with the motor rotating in the first direction of rotation may be identified in response to the current command indicating that the direction of current in the motor windings should be reversed and the output from the feedback controller for the motor indicating that the switching devices in the switch bridge for the motor may be controlled to configure the switch bridge for regenerating the present current in the motor windings.

For example, without limitation, the current command indicating that the direction of the current in the motor windings should be reversed may be indicated by the current command changing from calling for a negative current in the motor windings to the current command calling for a positive current in the motor windings. In the example described above, wherein the output from the feedback controller defines the desired duty cycle for switching of the switch bridge as a single signed value in the range from 1 to −1, the feedback controller output indicating that the switch bridge is configured for regenerating in this case may be indicated by the feedback controller output going to a positive value.

In response to a determination that the quadrant of operation of the motor is to change back from the braking quadrant of operation to the traction quadrant of operation, the switches in the switch bridge that are to be controlled to control the current in the windings of the motor may be changed back to the switches that were being controlled while the motor was operating in the traction quadrant of operation before the change from the traction quadrant of operation to the braking quadrant of operation (step 1412). Selecting the switches in the switch bridge that are to be controlled to control the current in the motor windings to be the switches that were controlled before the change to the braking quadrant of operation will result in the switches in the switch bridge being controlled to reverse the current in the motor windings from the second current direction back to the first current direction.

The switches in the switch bridge then may be controlled to short circuit the current in the motor windings through the switch bridge to configure the switch bridge for coasting (step 1414). The output of the feedback controller may be set to keep the switches in the switch bridge in the configuration for coasting the current in the motor windings through the switch bridge for a full switching cycle (step 1416).

Steps 1412 and 1414 may be performed as parts of the same operation or as separate operations. In the example described above, wherein the output from the feedback controller defines the desired duty cycle for switching of the switch bridge as a single signed value in the range from 1 to −1, the feedback controller output for configuring the switch bridge for coasting for a full duty cycle in this case may be set to 0. For example, switching cycle 900 in FIG. 9 may be an example of switch timing for the switches in the switch bridge as a result of setting the output of the feedback controller in step 1416. After the output of the feedback controller is set in step 1416, the feedback controller may be allowed to operate to adjust the output of the feedback controller to control the current in the windings of the motor in a normal manner.

In response to step 1416, the motor may be operating once again in the traction quadrant of operation in which the motor is rotating in the first direction of rotation and the current in the motor windings is in the first current direction to produce torque in the motor that is in the first direction of rotation. The process may then continue with step 1402.

If it determined at step 1410 that the quadrant of operation is not to change from the braking quadrant of operation with the motor rotating in the first direction of rotation back to the traction quadrant of operation with the motor rotating in the first direction of operation, it may be determined whether the quadrant of operation is to change from the braking quadrant of operation with the motor rotating in the first direction of rotation to a traction quadrant in which the motor is rotating in a second direction of rotation that is opposite to the first direction of rotation (step 1418). For example, step 1418 may include identifying a change in the quadrant of operation of the motor from braking to traction in the reverse direction of rotation in response to identifying a change in the direction of rotation of the motor from the first direction of rotation to the second direction of rotation.

In response to identifying a change in the quadrant of operation of the motor from braking to traction in the reverse direction of rotation in step 1418, the motor may be operating in a traction quadrant of operation in which the motor is rotating in the second direction of rotation, which is opposite to the first direction of rotation and wherein the current in the motor windings is the second current direction to produces torque in the motor that also is in the second direction of rotation. For example, without limitation, immediately in response to identifying a change in the quadrant of operation of the motor from braking to traction in the reverse direction of rotation in step 1418, the motor may be operating in quadrant 3 1212 in FIG. 12 or in quadrant 3 1306 in FIG. 13.

Process 1400 may terminate in response to identifying a change in the quadrant of operation of the motor in step 1418. Process 1400 may return to step 1410 in response to a determination in step 1418 that the quadrant of operation of the motor is not to change.

Step 1400 may be an example of one implementation of a process for changing the operation of a motor between quadrant 1 1208 and quadrant 4 1214 and to quadrant 3 1212 in FIG. 12, or for changing the operation of a motor between quadrant 1 1302 and quadrant 4 1308 and to quadrant 3 1306 in FIG. 13. A reciprocal process, may be used for changing the operation of the motor between quadrant 3 1212 and quadrant 2 1210 and to quadrant 1 1208 in FIG. 12 or for changing the operation of the motor between quadrant 3 1306 and quadrant 2 1304 and to quadrant 1 1302 in FIG. 13. The directions of rotation, current, and torque in the reciprocal process will be reversed from the directions of rotation, current, and referred to in process 1400.

Figure 15:
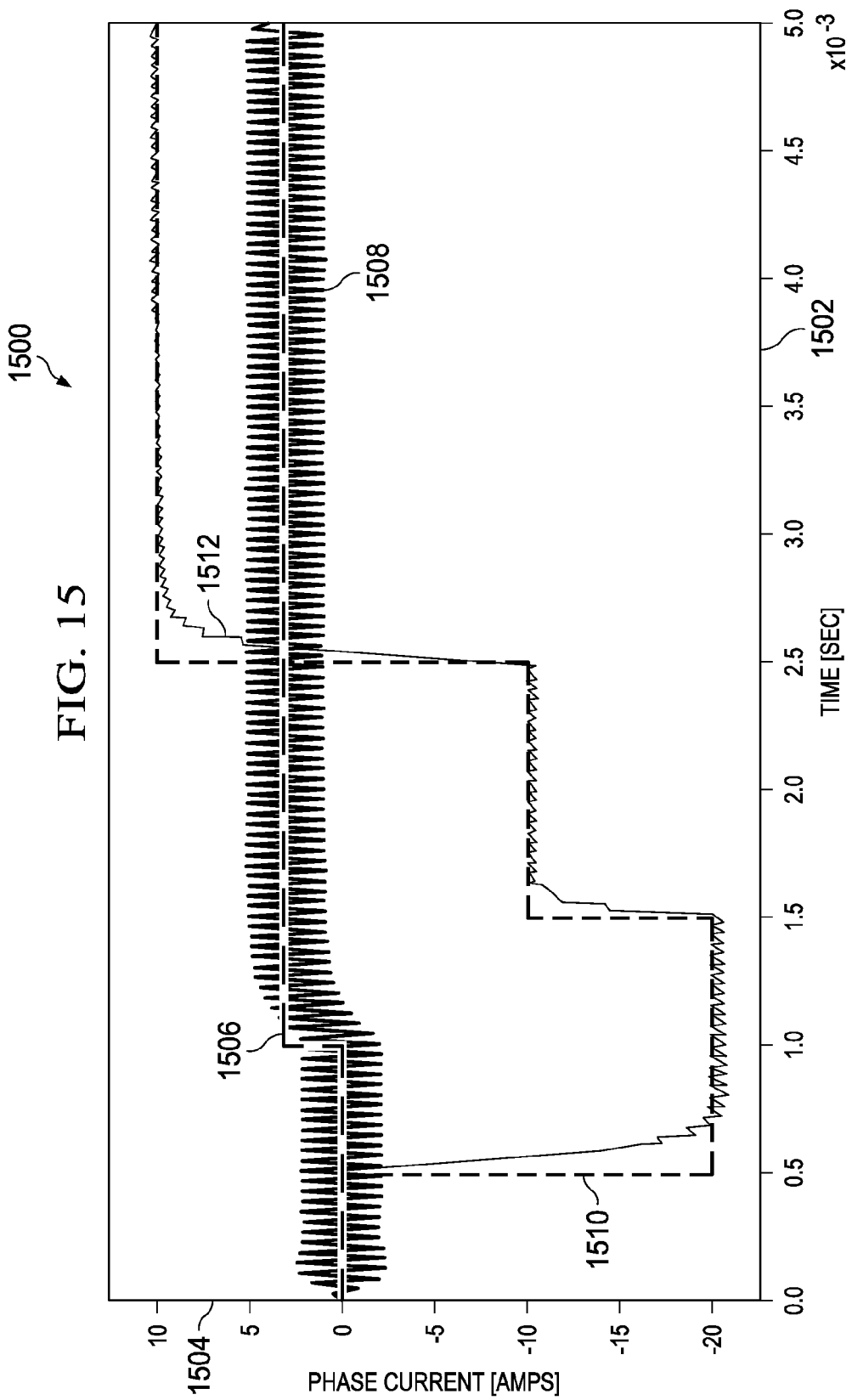
FIG. 15 is an illustration of a waveform diagram of current commands and currents in the windings of a motor in accordance with an illustrative embodiment.

Turning to FIG. 15, an illustration of a waveform diagram of current commands and currents in the windings of a motor are depicted in accordance with an illustrative embodiment. In this example, the waveforms in waveform diagram 1500 are generated by a computer implemented simulation of the operation of a brushless DC motor. Horizontal axis 1502 in waveform diagram 1500 indicates time in seconds. Vertical axis 1504 in waveform diagram 1500 indicates current in amps.

Waveform 1506 indicates the desired current in the windings for one phase in a first simulation of operation of the motor. Waveform 1506, therefore, corresponds to the current command for the current in the motor windings in the first simulation. Waveform 1508 indicates the simulated actual current in the motor windings for one phase of the motor wherein the switches in the switch bridge for the motor are controlled using conventional pulse width modulation to control the current in the motor windings to track the commanded current indicated by waveform 1506. Waveform 1508 indicates that controlling the current in the windings of the motor using conventional pulse width modulation results in a ripple current in the motor windings of approximately 4 amps peak-to-peak.

Waveform 1510 indicates the desired current in the windings for one phase in a second simulation of operation of the same motor. Waveform 1510 therefore corresponds to the current command for the current in the motor windings in the second simulation. Waveform 1512 indicates the simulated actual current in the motor windings for one phase of the motor wherein the switches in the switch bridge for the motor are controlled using impulse width modulation in accordance with an illustrative embodiment to control the current in the motor windings to track the commanded current indicated by waveform 1510. Waveform 1512 indicates that controlling the current in the windings of the motor using impulse width modulation in accordance with an illustrative embodiment results in a ripple current in the motor windings of approximately 0.4 amps peak-to-peak.

Comparing waveform 1508 to waveform 1512 indicates that controlling the current in the motor using impulse width modulation in accordance with an illustrative embodiment may reduce undesired ripple current in the motor windings by a significant amount in comparison with controlling the current in the motor using conventional pulse width modulation.

Waveform 1510 indicates a desired change in the direction of current in the motor windings by the current command at approximately time 2.5 seconds. This change in the direction of current in the motor windings may correspond to a change in the quadrant of operation of the motor. Waveform 1512 indicates that the change in the direction of the simulated actual current in the motor windings in response to the change in the quadrant of operation is relatively smooth and does not result in unacceptable currents in the motor windings when the quadrant change is controlled in accordance with an illustrative embodiment, as described herein.

The different illustrative embodiments can take the form of an entirely hardware embodiment, an entirely software embodiment, or an embodiment containing both hardware and software elements. Some embodiments are implemented in software, which includes, but is not limited to, forms such as, for example, without limitation, firmware, resident software, and microcode.

Furthermore, the different embodiments can take the form of a computer program product accessible from a computer usable or computer readable medium providing program code for use by, or in connection with, a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output, or I/O, devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples such as modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a motor comprising windings and a rotor;
    a switch bridge configured to couple a direct current power source to the windings via a plurality of switches;
    a feedback controller configured to generate an output relative to a difference between a desired current in the windings indicated by a current command and an actual current in the windings identified by current feedback;
    a switch controller configured to control the plurality of switches in response to the output from the feedback controller to control the actual current in the windings; and
    a quadrant change controller configured to identify a first quadrant change in an operation of the motor and to select first selected ones of the plurality of switches to be controlled by the switch controller to change a direction of the actual current in the windings in response to identifying the first quadrant change.

2. The apparatus of claim 1, wherein the quadrant change controller is configured to identify the first quadrant change in response to:
    the current command indicating a change in the direction of the desired current in the windings; and
    the output from the feedback controller controlling the switch controller to control the plurality of switches to configure the switch bridge for regenerating the actual current in the windings back to the direct current power source.

3. The apparatus of claim 1, wherein:
    the first quadrant change comprises a change from a traction quadrant of operation in which the rotor is rotating in a first direction of rotation and the actual current in the windings is in a first current direction to produce torque on the rotor in the first direction of rotation to a braking quadrant of operation in which the rotor is rotating in the first direction of rotation and the actual current in the windings is in a second current direction to produce the torque on the rotor in a second direction of rotation, wherein the first direction of rotation is different from the second direction of rotation and the first current direction is different from the second current direction; and
    the first selected ones of the plurality of switches to be controlled by the switch controller are selected to change the direction of the actual current in the windings from the first current direction to the second current direction.

4. The apparatus of claim 3, wherein the quadrant change controller is further configured to open the first selected ones of the plurality of switches in response to identifying the first quadrant change.

5. The apparatus of claim 4, wherein:
the switch controller is configured to open and close the first selected ones of the plurality of switches during a switching cycle to control the actual current in the windings; and
the quadrant change controller is further configured to set the output of the feedback controller to control the switch controller to open the first selected ones of the plurality of switches for a full switching cycle in response to identifying the first quadrant change.

6. The apparatus of claim 3, wherein the quadrant change controller is further configured to:
identify a second quadrant change in the operation of the motor from the braking quadrant of operation to the traction quadrant of operation;
in response to identifying the second quadrant change, select second selected ones of the plurality of switches to be controlled to change the direction of the actual current in the windings from the second current direction to the first current direction; and
in response to identifying the second quadrant change, control the second selected ones of the plurality of switches to short circuit the actual current in the windings through the switch bridge.

7. The apparatus of claim 6, wherein:
the switch controller is configured to open and close the second selected ones of the plurality of switches during a periodic switching cycle to control the actual current in the windings; and
the quadrant change controller is further configured to set the output of the feedback controller to control the switch controller to control the second selected ones of the plurality of switches to short circuit the actual current in the windings through the switch bridge for a full switching cycle in response to identifying the second quadrant change.

8. The apparatus of claim 3, wherein the quadrant change controller is configured to identify a second quadrant change from the braking quadrant of operation to a reverse traction quadrant of operation in which the rotor is rotating in the second direction of rotation and the actual current in the windings is in the second current direction to produce the torque on the rotor in the second direction of rotation.

9. The apparatus of claim 1, wherein the feedback controller is a proportional-integral controller.

10. The apparatus of claim 1, wherein the plurality of switches comprise a switching devices configured to conduct in a first direction when the switching devices are closed and diodes parallel with the switching devices are configured to conduct in a second direction opposite to the first direction.

11. The apparatus of claim 1, wherein the apparatus is on an aircraft.

12. A method of controlling a change in a quadrant of operation of a brushless direct current motor, comprising:
identifying a first quadrant change in an operation of a motor; and
in response to identifying the first quadrant change, selecting first selected ones of a plurality of switches in a switch bridge to be controlled to couple a direct current power source to windings of the motor to change a direction of an actual current in the windings.

13. The method of claim 12, wherein identifying the first quadrant change comprises:

identifying a current command indicating a change in a direction of a desired current in the windings; and
identifying an output from a feedback controller controlling the plurality of switches to configure the switch bridge for regenerating the actual current in the windings back to the direct current power source.

14. The method of claim 12, wherein:
the first quadrant change comprises a change from a traction quadrant of operation in which a rotor of the motor is rotating in a first direction of rotation and the actual current in the windings of the motor is in a first current direction to produce torque on the rotor in the first direction of rotation to a braking quadrant of operation in which the rotor is rotating in the first direction of rotation and the actual current in the windings is in a second current direction to produce the torque on the rotor in a second direction of rotation, wherein the first direction of rotation is different from the second direction of rotation and the first current direction is different from the second current direction; and
opening the first selected ones of the plurality of switches in response to identifying the first quadrant change.

15. The method of claim 14 further comprising setting an output of a feedback controller to open the first selected ones of the plurality of switches for a full switching cycle in response to identifying the first quadrant change.

16. The method of claim 15 further comprising setting the output of the feedback controller to control second selected ones of the plurality of switches to short circuit the actual current in the windings through the switch bridge for the full switching cycle in response to identifying a second quadrant change.

17. The method of claim 14 further comprising:
identifying a second quadrant change in the operation of the motor from the braking quadrant of operation to the traction quadrant of operation;
in response to identifying the second quadrant change, selecting second selected ones of the plurality of switches to be controlled to change the direction of the actual current in the windings from the second current direction to the first current direction; and
in response to identifying the second quadrant change, controlling the second selected ones of the plurality of switches to short circuit the actual current in the windings through the switch bridge.

18. A method of controlling a change in a quadrant of operation of a brushless direct current motor, comprising:
identifying a quadrant change in an operation of a motor;
in response to identifying the quadrant change, selecting selected ones of a plurality of switches in a switch bridge to be controlled to couple a direct current power source to windings of the motor to change a direction of an actual current in the windings; and
in response to identifying the quadrant change, controlling the selected ones of the plurality of switches to short circuit the actual current in the windings through the switch bridge.

19. The method of claim 18, wherein the quadrant change is a change from a braking quadrant of operation in which a rotor of the motor is rotating in a first direction of rotation and the actual current in the windings of the motor is in a second current direction to produce torque on the rotor in a second direction of rotation to a traction quadrant of operation in which the rotor is rotating in the first direction of rotation and the actual current in the windings is in a first current direction to produce the torque on the rotor in the first direction of rotation, wherein the first direction of rotation is different from the second direction of rotation and the first current direction is different from the second current direction.

20. The method of claim 18 further comprising setting an output of a feedback controller to control the selected ones of the plurality of switches to short circuit the actual current in the windings through the switch bridge for a full switching cycle in response to identifying the quadrant change.

* * * * *